(12) United States Patent
Matsuda et al.

(10) Patent No.: US 7,167,645 B2
(45) Date of Patent: Jan. 23, 2007

(54) IMAGE PROCESSING SYSTEM, PROJECTOR, INFORMATION STORAGE MEDIUM, AND IMAGE PROCESSING METHOD

(75) Inventors: Hideki Matsuda, Fujimi-machi (JP); Kunio Yoneno, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 185 days.

(21) Appl. No.: 10/944,139

(22) Filed: Sep. 20, 2004

(65) Prior Publication Data

US 2005/0105057 A1 May 19, 2005

(30) Foreign Application Priority Data

Sep. 26, 2003 (JP) ............................. 2003-334980
May 25, 2004 (JP) ............................. 2004-154786

(51) Int. Cl.
- G03B 71/00 (2006.01)
- G03B 21/14 (2006.01)
- H04N 7/18 (2006.01)
- H04N 5/235 (2006.01)

(52) U.S. Cl. ................ 396/213; 396/429; 353/70; 348/61; 348/362; 382/100

(58) Field of Classification Search ............. 353/69, 353/70; 348/177, 178, 187–189, 745, 806, 348/61, 135, 362–365; 396/429
See application file for complete search history.

(56) References Cited

U.S. PATENT DOCUMENTS

| | | | |
|---|---|---|---|
| 6,057,881 A | 5/2000 | Kawashima et al. | |
| 6,932,479 B2 * | 8/2005 | Kobayashi et al. | 353/69 |
| 6,932,480 B2 * | 8/2005 | Wada et al. | 353/69 |
| 6,939,011 B2 * | 9/2005 | Kobayashi | 353/69 |
| 2003/0058252 A1 | 3/2003 | Matsuda et al. | |

FOREIGN PATENT DOCUMENTS

| | | |
|---|---|---|
| EP | 1 065 885 A | 1/2001 |
| JP | A 6-269015 | 9/1994 |
| JP | A 6-276532 | 9/1994 |
| JP | A 8-271852 | 10/1996 |
| JP | A 10-200836 | 7/1998 |
| JP | A 2001-61121 | 3/2001 |
| JP | A 2001-83949 | 3/2001 |
| JP | A 2003-108109 | 4/2003 |
| JP | A 2004-48694 | 2/2004 |
| JP | A 2004-48695 | 2/2004 |
| WO | WO 02/47395 A | 6/2002 |

\* cited by examiner

*Primary Examiner*—W. B. Perkey
(74) *Attorney, Agent, or Firm*—Oliff & Berridge, PLC

(57) ABSTRACT

A projector includes an image projection section which projects a white image and a black image, a sensor which has an exposure adjustment function, generates first sensing information by sensing the white image, and generates second sensing information by sensing the black image, a sensing condition setting section which controls exposure of the sensor so that the sensor senses the white image at an automatic exposure setting and senses the black image at the exposure setting determined when sensing the white image, a difference information generation section which generates difference information based on the first sensing information and the second sensing information, and an endpoint detection section which detects an endpoint of a projection region in a sensing region based on the difference information.

22 Claims, 21 Drawing Sheets

IMAGE PROCESSING SYSTEM, PROJECTOR, INFORMATION STORAGE MEDIUM, AND IMAGE PROCESSING METHOD

Japanese Patent Application No. 2003-334980, filed on Sep. 26, 2003, and Japanese Patent Application No. 2004-154786, filed on May 25, 2004 are hereby incorporated by reference in their entirety.

BACKGROUND OF THE INVENTION

The present invention relates to an image processing system, a projector, a program, an information storage medium, and an image processing method which detect endpoints of a projection region based on sensing information.

In the case of projecting an image onto a screen using a projector, keystone distortion may occur in the projected image. As a method for correcting keystone distortion or the like, a method including sensing a projection region formed on a screen using a camera, and determining the shape of the projection region based on the sensing information to correct keystone distortion has been known.

Japanese Patent Application Laid-open No. 2003-108109 has disclosed an image processing system which projects two different calibration images, senses each of the calibration images, and determines the projection region based on the difference between the two pieces of sensing information, for example.

However, Japanese Patent Application Laid-open No. 2003-108109 does not disclose the setting of exposure of the sensing means at the time of sensing.

In the case of a projector provided with a camera, the exposure setting of the camera is fixed at the setting in an ideal use environment in which the influence of external light does not occur.

However, the influence of external light may occur in an actual use environment. In order to accurately correct image distortion, a projector must accurately determine the projection region by acquiring accurate sensing information even in such a case. In the case where the projection distance is great or the reflectance of the screen is low, the projected image becomes darker, whereby it may be difficult for the camera to accurately sense the image.

In an actual use environment, a part of the projected image may be displayed outside the screen due to the restrictions on the installation position of the projector or the like. A projector or the like which appropriately adjusts the position of the projected image or the like even in such a case has been demanded.

BRIEF SUMMARY OF THE INVENTION

The present invention has been achieved in view of the above-described problems. The present invention may provide an image processing system, a projector, a program, an information storage medium, and an image processing method which can more accurately detect endpoints of a projection region in a sensing region based on sensing information.

A first aspect of the present invention relates to an image processing system and a projector, each of which includes:

image projection means for projecting first and second calibration images at different timings;

sensing means, having an exposure adjustment function, for generating first sensing information and second sensing information by sensing each of the projected first and second calibration images;

difference information generation means for generating difference information which shows a difference in a predetermined image signal value for each pixel in each of the first and second calibration images in a sensing region of the sensing means based on the first sensing information and the second sensing information; and endpoint detection means for searching the difference information as search target and for detecting an endpoint of a projection region in the sensing region, wherein the sensing means senses the first calibration image at an automatic exposure, and the sensing means senses the second calibration image at an exposure state determined when sensing the first calibration image.

A second aspect of the present invention relates to an image processing system and a projector, each of which includes:

an image projection section which projects first and second calibration images at different timings;

a sensing section, having an exposure adjustment function, which generates first sensing information and second sensing information by sensing each of the projected first and second calibration images;

a difference information generation section which generates difference information which shows a difference in a predetermined image signal value for each pixel in each of the first and second calibration images in a sensing region of the sensing section based on the first sensing information and the second sensing information; and an endpoint detection section which searches the difference information as search target and detects an endpoint of a projection region in the sensing region, wherein the sensing section senses the first calibration image at an automatic exposure, and the sensing section senses the second calibration image at an exposure state determined when sensing the first calibration image.

A third aspect of the present invention relates to a computer-readable program which causes a computer to function as:

image projection means for projecting first and second calibration images at different timings;

sensing means, having an exposure adjustment function, for generating first sensing information and second sensing information by sensing each of the projected first and second calibration images;

difference information generation means for generating difference information which shows a difference in a predetermined image signal value for each pixel in each of the first and second calibration images in a sensing region of the sensing means based on the first sensing information and the second sensing information; and endpoint detection means for searching the difference information as search target and for detecting an endpoint of a projection region in the sensing region, wherein the sensing means senses the first calibration image at an automatic exposure, and the sensing means senses the second calibration image at an exposure state determined when sensing the first calibration image.

A fourth aspect of the present invention relates to an information storage medium which stores the above computer-readable program.

A fifth aspect of the present invention relates to an image processing method including:

projecting a first calibration image;

generating first sensing information by sensing the projected first calibration image at an automatic exposure setting;

projecting a second calibration image;

generating second sensing information by sensing the projected second calibration image at an exposure determined when sensing the first calibration image;

generating difference information which shows a difference in a predetermined image signal value for each pixel in a sensing region based on the first sensing information and the second sensing information; and searching the difference information as a search target and detecting an endpoint of a projection region in the sensing region.

According to the present invention, the image processing system and the like can generate the first sensing information at an exposure conforming to the application environment by generating the first sensing information by sensing the first calibration image at the automatic exposure setting. The image processing system and the like can generate the second sensing information at an exposure suitable for generating the difference information by generating the second sensing information by sensing the second calibration image at the exposure determined when sensing the first calibration image.

The image processing system and the like can more accurately determine the projection region in the sensing region by detecting the endpoints of the projection region in the sensing region based on the first sensing information and the second sensing information.

As the difference, the difference value, ratio, or the like is applied.

A sixth aspect of the present invention relates to an image processing system and a projector, each of which includes:

image projection means for projecting first and second calibration images at different timings;

sensing means, having an exposure adjustment function, for generating first sensing information and second sensing information by sensing each of the projected first and second calibration images;

difference information generation means for dividing a predetermined pixel region in a sensing region of the sensing means into pixel blocks each of which is formed of a plurality of pixels, for generating first pixel block preprocessing information and second pixel block preprocessing information which show an average value or sum of a predetermined image signal value of each of the pixels or the predetermined image signal value of a representative pixel in each of the pixel blocks based on the first sensing information and the second sensing information, for setting a pixel region which becomes a reference for an endpoint of a projection region in the sensing region based on a difference between the first pixel block preprocessing information and the second pixel block preprocessing information, and for generating difference information which shows a difference in the predetermined image signal value for each of the pixels near the pixel region based on the first sensing information and the second sensing information; and endpoint detection means for searching the difference information as search target and for detecting the endpoint of the projection region in the sensing region, wherein the sensing means senses the first calibration image at an automatic exposure, and the sensing means senses the second calibration image at an exposure state determined when sensing the first calibration image.

A seventh aspect of the present invention relates to an image processing system and a projector, each of which includes:

an image projection section which projects first and second calibration images at different timings;

a sensing section, having an exposure adjustment function, which generates first sensing information and second sensing information by sensing each of the projected first and second calibration images;

a difference information generation section which divides a predetermined pixel region in a sensing region of the sensing section into pixel blocks each of which is formed of a plurality of pixels, generates first pixel block preprocessing information and second pixel block preprocessing information which show an average value or sum of a predetermined image signal value of each of the pixels or the predetermined image signal value of a representative pixel in each of the pixel blocks based on the first sensing information and the second sensing information, sets a pixel region which becomes a reference for an endpoint of a projection region in the sensing region based on a difference between the first pixel block preprocessing information and the second pixel block preprocessing information, and generates difference information which shows a difference in the predetermined image signal value for each of the pixels near the pixel region based on the first sensing information and the second sensing information; and an endpoint detection section which searches the difference information as search target and detects the endpoint of the projection region in the sensing region, wherein the sensing section senses the first calibration image at an automatic exposure, and the sensing section senses the second calibration image at an exposure state determined when sensing the first calibration image.

An eighth aspect of the present invention relates to a computer-readable program which causes a computer to function as:

image projection means for projecting first and second calibration images at different timings;

sensing means, having an exposure adjustment function, for generating first sensing information and second sensing information by sensing each of the projected first and second calibration images;

difference information generation means for dividing a predetermined pixel region in a sensing region of the sensing means into pixel blocks each of which is formed of a plurality of pixels, for generating first pixel block preprocessing information and second pixel block preprocessing information which show an average value or sum of a predetermined image signal value of each of the pixels or the predetermined image signal value of a representative pixel in each of the pixel blocks based on the first sensing information and the second sensing information, for setting a pixel region which becomes a reference for an endpoint of a projection region in the sensing region based on a difference between the first pixel block preprocessing information and the second pixel block preprocessing information, and for generating difference information which shows a difference in the predetermined image signal value for each of the pixels near the pixel region based on the first sensing information and the second sensing information; and endpoint detection means for searching the difference information as search target and for detecting the endpoint of the projection region in the sensing region, wherein the sensing means senses the first calibration image at an automatic exposure, and the sensing means senses the second calibration image at an exposure state determined when sensing the first calibration image.

A ninth aspect of the present invention relates to an information storage medium which stores the above computer-readable program.

A tenth aspect of the present invention relates to an image processing method including:

projecting a first calibration image;

generating first sensing information by sensing the projected first calibration image at an automatic exposure setting;

projecting a second calibration image;

generating second sensing information by sensing the projected second calibration image at an exposure determined when sensing the first calibration image;

dividing a predetermined pixel region in a sensing region into pixel blocks each of which is formed of a plurality of pixels based on the first sensing information and the second sensing information;

generating first pixel block preprocessing information and second pixel block preprocessing information which show an average value or sum of a predetermined image signal value of each of the pixels or the predetermined image signal value of the representative pixel in each of the pixel blocks;

setting a pixel region which becomes a reference for an endpoint of a projection region in the sensing region based on a difference between the first pixel block preprocessing information and the second pixel block preprocessing information;

generating difference information which shows a difference in the predetermined image signal value for each of the pixels near the pixel region based on the first sensing information and the second sensing information; and searching the difference information as a search target and detecting the endpoint of the projection region in the sensing region.

According to the present invention, the image processing system and the like can generate the first sensing information at an exposure conforming to the application environment by generating the first sensing information by sensing the first calibration image at the automatic exposure setting. The image processing system and the like can generate the second sensing information at an exposure suitable for generating the difference information by generating the second sensing information by sensing the second calibration image at the exposure determined when sensing the first calibration image.

The image processing system and the like can more accurately determine the projection region in the sensing region by detecting the endpoints of the projection region in the sensing region based on the first sensing information and the second sensing information.

According to the present invention, the image processing system and the like can detect a desired endpoint in a shorter period of time by setting the pixel region which becomes the reference for the endpoint and searching the pixels near the pixel region for the difference in each pixel.

With any of the above image processing systems, projectors, programs and information storage mediums, the image projection means may project a single-color white calibration image as the first calibration image, and may project a single-color black calibration image as the second calibration image.

With any of the above image processing methods, the first calibration image may be a single-color white calibration image, and the second calibration image may be a single-color black calibration image.

According to this feature, by sensing the white calibration image at the automatic exposure, the image processing system and the like can sense an image more effectively using the dynamic range of a camera than the case of sensing an image at a fixed exposure, even when the influence of external light occurs, when the reflected projection light is too weak since the projection distance is too far or the reflectance of the screen is too low, and when the reflected projection light is too strong since the projection distance is too near or the reflectance of the screen is too high.

Moreover, the image processing system and the like can more clearly determine the difference when determining the difference between the white sensing information and the black sensing information by sensing the black calibration image at the exposure determined when sensing the white calibration image. Therefore, the image processing system and the like can more accurately determine the image projection region.

With any of the above image processing systems, projectors, programs and information storage mediums, the difference information generation means may generate a differential image between a first sensing image expressed by the first sensing information and a second sensing image expressed by the second sensing information as the difference information, the differential image may include a center block region located near a center of the differential image, a peripheral block region located around the center block region, and a background region other than the center block region and the peripheral block region, and each pixel in the center block region and the peripheral block region may have a brightness index value differing from a brightness index value of each pixel in the background region.

With any of the above image processing methods, a differential image between a first sensing image expressed by the first sensing information and a second sensing image expressed by the second sensing information may be generated as the difference information, the differential image may include a center block region located near a center of the differential image, a peripheral block region located around the center block region, and a background region other than the center block region and the peripheral block region, and each pixel in the center block region and the peripheral block region may have a brightness index value differing from a brightness index value of each pixel in the background region.

With any of the above image processing systems, projectors, programs and information storage mediums, the endpoint detection means may include:

center reference position detection means for detecting a plurality of center reference positions of the center block region in the sensing region of the sensing means based on the differential image;

peripheral reference position detection means for detecting a plurality of peripheral reference positions of the peripheral block region in the sensing region based on the center reference position; and projection region information generation means for generating projection region information which shows the endpoint of the projection region based on the center reference positions and the peripheral reference positions.

Any of the above image processing methods may include:

detecting a plurality of center reference positions of the center block region in the sensing region based on the differential image;

detecting a plurality of peripheral reference positions of the peripheral block region in the sensing region based on the center reference position; and generating projection region information which shows the endpoint of the projection region based on the center reference positions and the peripheral reference positions.

According to this feature, the image processing system and the like can accurately detect the endpoints of the projection region based on the center reference positions by detecting the center reference positions of the center block region which is smaller than the projection region corresponding to the projected image, even if a part of the projected image is displayed outside the projection target.

In particular, since the image processing system and the like can determine the endpoints of the projection region based on not only the center reference positions but also on the peripheral reference positions of the peripheral block region located on the periphery of the center reference positions, the image processing system and the like can more accurately detect the endpoints of the projection region.

The image processing system and the like may employ a single-color image as the first calibration image, and employ an image which includes a center block region located near the center of the image, a peripheral block region located around the center block region, and a background region other than the center block region and the peripheral block region, and in which each pixel in the center block region and the peripheral block region has an index value differing from the index value of each pixel in the background region as the second calibration image, for example.

With any of the above image processing systems, projectors, programs and information storage mediums, the projection region information generation means may generate the projection region information by determining shape or arrangement of the center block region and the peripheral block region by setting a plurality of approximation lines or approximation curves based on the center reference positions and the peripheral reference positions.

Any of the above image processing methods may include generating the projection region information by determining shape or arrangement of the center block region and the peripheral block region by setting a plurality of approximation lines or approximation curves based on the center reference positions and the peripheral reference positions.

With any of the above image processing systems, projectors, programs and information storage mediums, the projection region and the center block region may be rectangular regions, and the projection region information generation means may determine positions of four corners of the center block region by detecting intersecting points of the plurality of approximation lines or intersecting points of the plurality of approximation curves, and may generate the projection region information which shows positions of four corners of the projection region based on the positions of the four corners of the center block region.

With any of the above image processing methods, the projection region and the center block region may be rectangular regions, and the method may include determining positions of four corners of the center block region by detecting intersecting points of the plurality of approximation lines or intersecting points of the plurality of approximation curves, and generating the projection region information which shows positions of four corners of the projection region based on the positions of the four corners of the center block region.

According to this feature, since the image processing system and the like can determine the positions of the four corners of the projection region based on the positions of the four corners of the center block region, the positions of the four corners of the projection region can be determined with a reduced amount of processing.

DETAILED DESCRIPTION OF THE EMBODIMENT

The present invention is described below with reference to the drawings taking the case of applying the present invention to a projector including an image processing system as an example. Note that the embodiments described below do not in any way limit the scope of the invention defined by the claims laid out herein. Note also that all the elements of the embodiments described below should not be taken as essential requirements for the invention defined by the claims laid out herein.

A method for detecting endpoints of a projection region using a pixel block is described as the first embodiment, and a method for detecting endpoints of a projection region using a patterned image is described as the second embodiment.

First Embodiment

Figure 1:
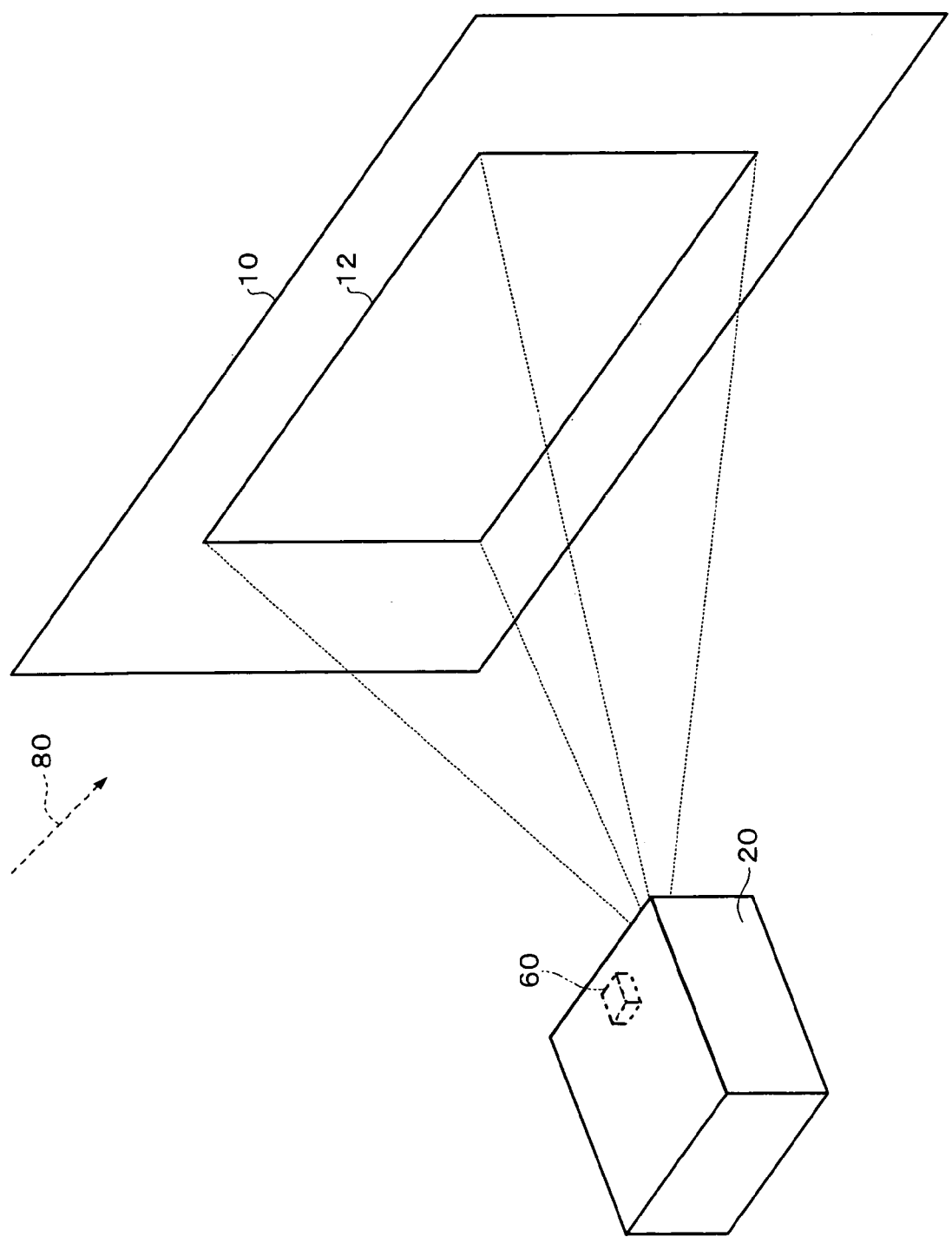
FIG. 1 is a schematic diagram showing an image projection state in a first embodiment.

FIG. 1 is a schematic diagram showing a image projection state in the first embodiment.

A projector 20 projects an image onto a screen 10 which is one type of a projection target. A projection region 12 is formed on the screen 10.

In this embodiment, the projector 20 performs various types of image processing by generating sensing information of the projection region 12 using sensing means having an exposure adjustment function, and detecting the endpoints of the projection region in the sensing region based on the sensing information.

In order to perform such processing, the projector 20 in this embodiment includes a sensor 60 which is the sensing means. The sensor 60 generates the sensing information by sensing a region including the projection region 12 through a sensing plane (sensing region).

Figure 2:
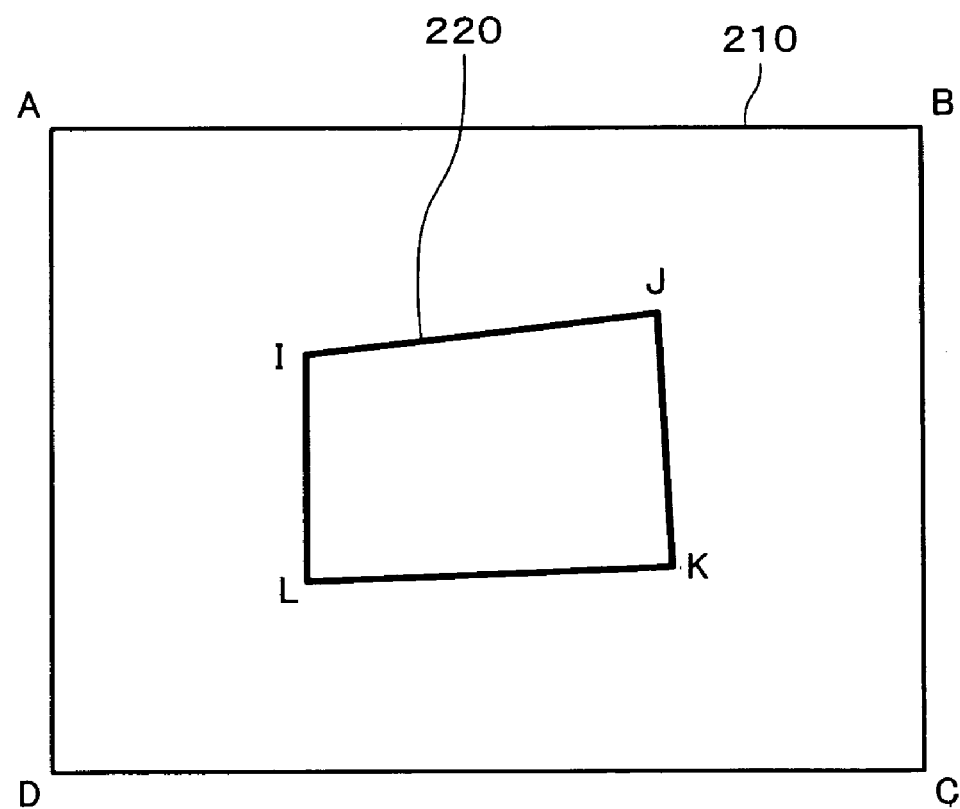
FIG. 2 is a schematic diagram of a sensing region in the first embodiment.

FIG. 2 is a schematic diagram of a sensing region 210 in the first embodiment.

The sensing region 210 is a region in the sensing plane. In FIG. 2, the sensing region 210 is a quadrilateral region ABCD consisting of a predetermined number of pixels. The projection region 220 which shows the shape of the actually projected image in the sensing region 210 is a region enclosed by four points I, J, K, and L.

The shape of the projection region 220 changes depending on the optical axis of projection light from the projector 20, the optical axis of the sensor 60, and the angle of the screen 10, for example. Light reflected from the screen 10 (reflected projection light) changes depending on the influence of external light 80, the reflectance of the screen 10, and the projection distance, even if the projector 20 projects the same projection light, for example.

In this embodiment, the projector 20 projects a single-color white calibration image (hereinafter called "all-white image") and a single-color black calibration image (hereinafter called "all-black image").

The sensor 60 senses the all-white image at an automatic exposure, and senses the all-black image at the exposure determined when sensing the all-white image.

The sensor 60 can sense an image at an appropriate exposure corresponding to the influence of the external light 80 on the projection region 12 on the screen 10 and the intensity of reflected light due to the difference in the projection distance and the reflectance of the screen 10 by sensing the all-white image at the automatic exposure. The sensor 60 can generate appropriate difference information by sensing the all-black image at the exposure determined when sensing the all-white image when generating the difference information which shows the difference value between the all-white image and the all-black image for each pixel.

The projector 20 can more accurately detect the endpoints of the projection region 220 in the sensing region 210 by performing image processing based on the difference information.

Functional blocks of the projector 20 for implementing the above-described functions are described below.

Figure 3:
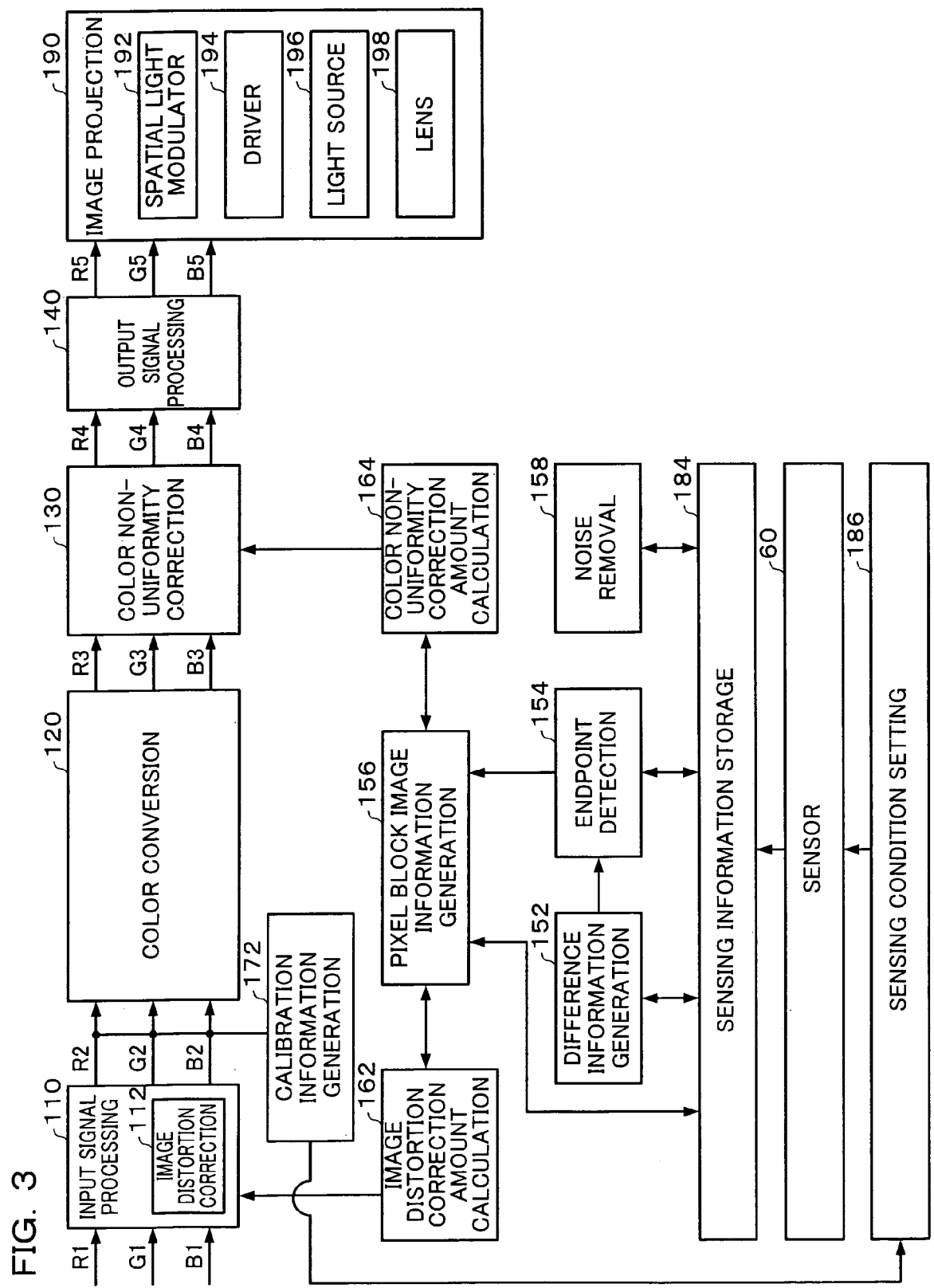
FIG. 3 is a functional block diagram of a projector in the first embodiment.

FIG. 3 is a functional block diagram of the projector 20 in the first embodiment.

The projector 20 includes an input signal processing section 110 which converts analog RGB signals (R1, G1, B1) input from a personal computer (PC) or the like into digital RGB signals (R2, G2, B2), a color conversion section 120 which converts the digital RGB signals (R2, G2, B2) into digital RGB signals (R3, G3, B3) so as to correct the color and brightness of an image, a color non-uniformity correction section 130 which converts the digital RGB signals (R3, G3, B3) into digital RGB signals (R4, G4, B4) so as to correct color non-uniformity, an output signal processing section 140 which converts the digital RGB signals (R4, G4, B4) into analog RGB signals (R5, G5, B5), and an image projection section 190 which projects an image based on the analog RGB signals.

The image projection section 190 includes a spatial light modulator 192, a driver section 194 which drives the spatial light modulator 192, a light source 196, and a lens 198. The driver section 194 drives the spatial light modulator 192 based on the image signals from the output signal processing section 140. The image projection section 190 projects light from the light source 196 through the spatial light modulator 192 and the lens 198.

The projector 20 includes a calibration information generation section 172 which generates image information (RGB signals) for displaying the all-white image and the all-black image, the sensor 60 which has the exposure adjustment function and generates sensing information of the all-white image (first sensing information) and sensing information of the all-black image (second sensing information), a sensing condition setting section 186 which sets exposure of the sensor 60, and a sensing information storage section 184 which temporarily stores the first sensing information and the second sensing information from the sensor 60 and the like. The sensor 60 and the sensing condition setting section 186 function as the sensing means.

The projector 20 includes a noise removal section 158 which reduces noise of the first sensing information and the second sensing information, a difference information generation section 152 which generates difference information based on the first sensing information and the second sensing information in which the noise is reduced, and an endpoint detection section 154 which detects the endpoints of the projection region 220 based on the difference information.

The projector 20 includes a pixel block image information generation section 156 which generates a pixel block image based on the endpoints detected by the endpoint detection section 154, an image distortion correction section 112 which corrects image distortion (keystone distortion or the like) on the digital-converted RGB signals, an image distortion correction amount calculation section 162 which calculates the image distortion correction amount for the image distortion correction section 112 based on the pixel block image, and a color non-uniformity correction amount calculation section 164 which calculates the color non-uniformity correction amount for the color non-uniformity correction section 130 based on the pixel block image. The image color non-uniformity correction, image distortion correction, and image brightness correction are described later.

As hardware for implementing each section of the projector 20, the following hardware may be applied, for example.

Figure 4:
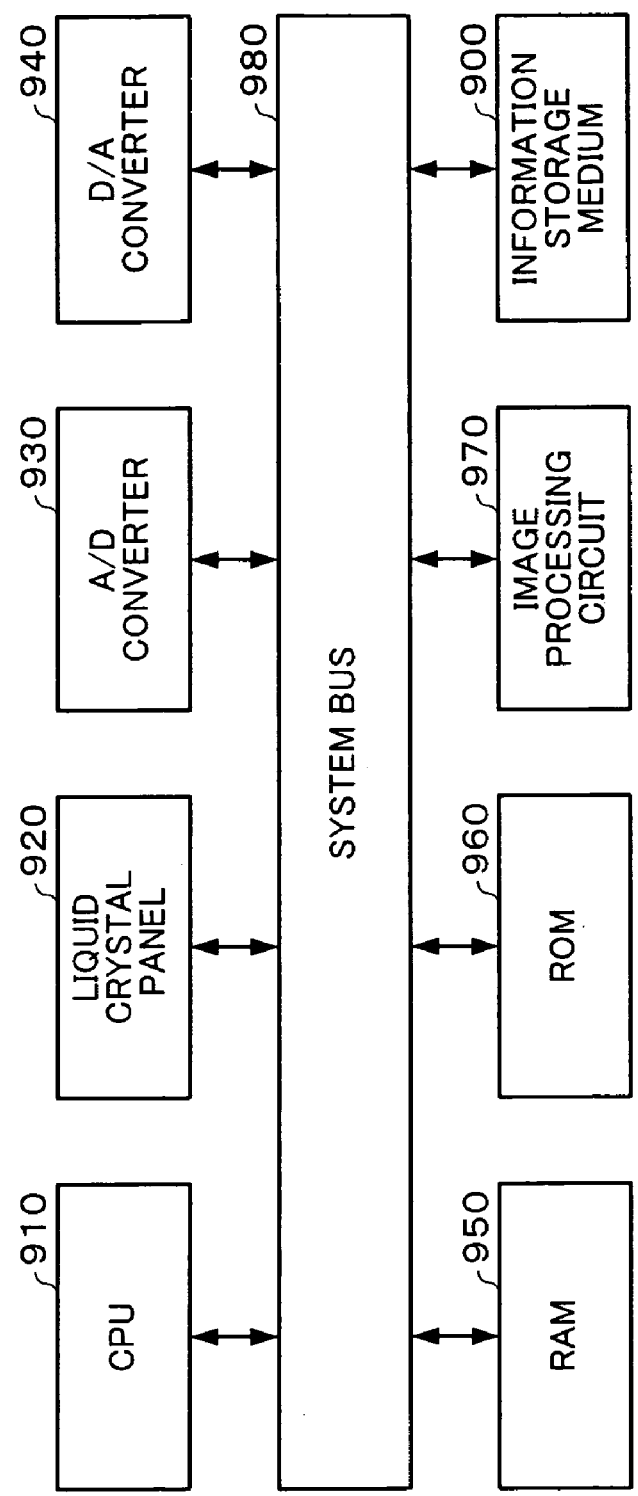
FIG. 4 is a hardware block diagram of a projector in the first embodiment.

FIG. 4 is a hardware block diagram of the projector 20 in the first embodiment.

For example, each section of the projector 20 may be implemented by using an A/D converter 930 or the like as the input signal processing section 110, a RAM 950 or the like as the sensing information storage section 184, an image processing circuit 970 or the like as the color non-uniformity correction section 130, the difference information generation section 152, the endpoint detection section 154, the pixel block image information generation section 156, and the calibration information generation section 172, a CPU 910 or the like as the image distortion correction amount calculation section 162 and the color non-uniformity correction amount calculation section 164, the image processing circuit 970, RAM 950, CPU 910, or the like as the color conversion section 120, a D/A converter 940 or the like as the output signal processing section 140, a liquid crystal panel 920 or the like as the spatial light modulator 192, and a ROM 960 which stores a liquid crystal light valve driver which drives the liquid crystal panel 920 or the like as the driver section 194.

These sections can exchange information through a system bus 980.

Each of these sections may be implemented by hardware such as a circuit, or may be implemented by software such as a driver.

The function of the difference information generation section 152 or the like may be implemented by a computer by reading a program from an information storage medium 900 which stores a program for allowing the computer to function as the difference information generation section 152 or the like.

As the information storage medium 900, a CD-ROM, DVD-ROM, ROM, RAM, HDD, or the like may be applied. The program reading method may be either a contact method or a noncontact method.

Each of the above-described functions may be implemented by downloading a program or the like for implementing each of the functions from a host device or the like through a transmission line instead of the information storage medium 900.

A flow of endpoint detection processing using these sections is described below.

Figure 5:
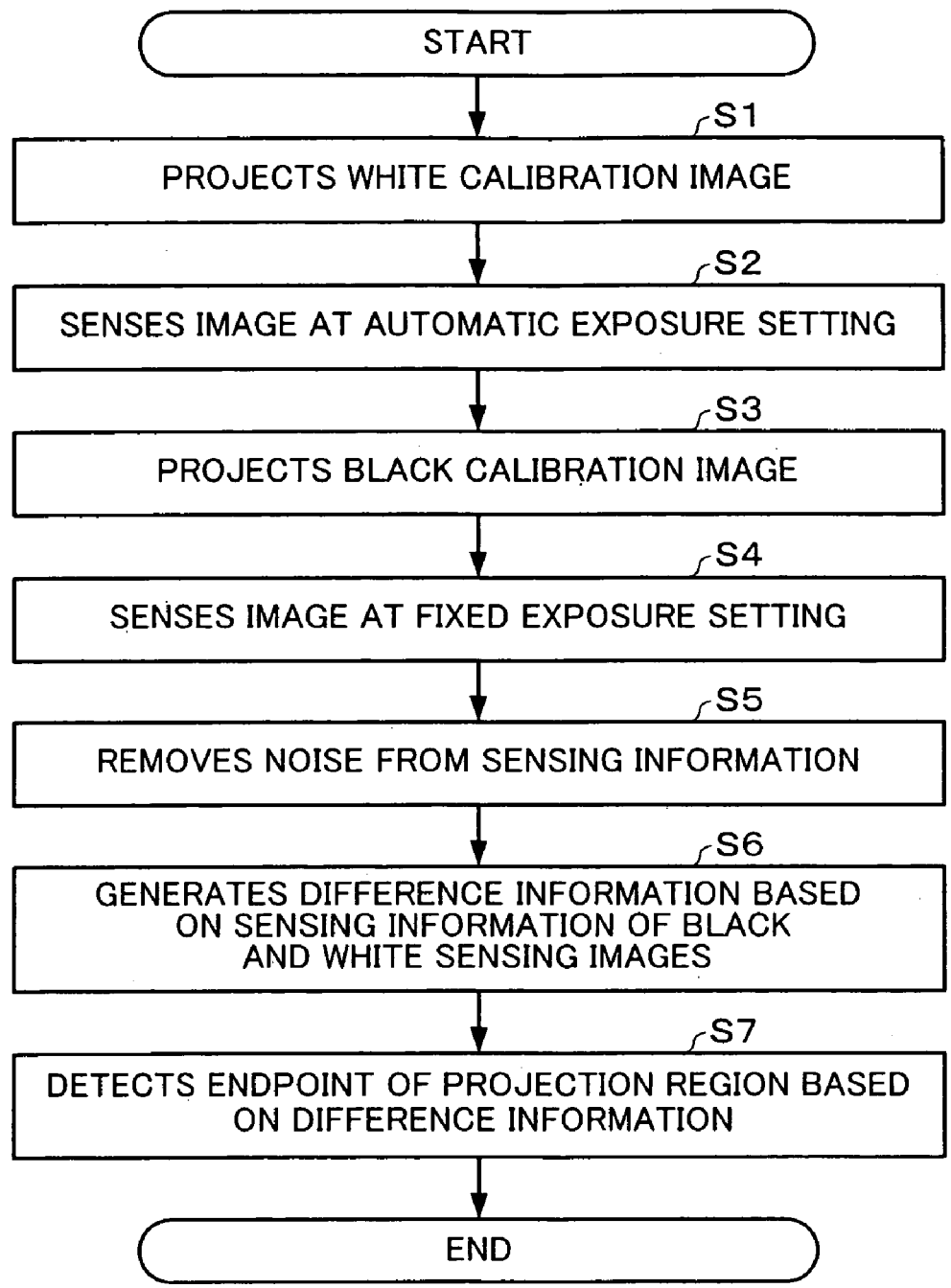
FIG. 5 is a flowchart showing a flow of endpoint detection processing in the first embodiment.

FIG. 5 is a flowchart showing a flow of endpoint detection processing in the first embodiment.

The calibration information generation section 172 generates image signals for the all-white image, and the image projection section 190 projects the all-white image onto the screen 10 based on the image signals processed by the output signal processing section 140 (step S1).

The sensing condition setting section 186 controls the sensor 60 so that the sensor 60 senses an image at an automatic exposure setting. The sensor 60 senses a region including the all-white image projected onto the screen 10 at the automatic exposure setting and generates the first sensing information (step S2). The sensing information storage section 184 stores the first sensing information from the sensor 60. The sensing condition setting section 186 fixes the exposure of the sensor 60 at the exposure determined when sensing the all-white image.

The calibration information generation section 172 generates image signals for the all-black image, and the image projection section 190 projects the all-black image onto the screen 10 based on the image signals processed by the output signal processing section 140 (step S3).

The sensor 60 senses a region including the all-black image projected onto the screen 10 at the fixed exposure setting and generates the second sensing information (step S4). The sensing information storage section 184 stores the second sensing information from the sensor 60.

The sensing information is information represented by a predetermined image signal value such as an R signal value, a G signal value, a B signal value, a Y signal value, a luminance value, and an average value of primary color values for each pixel sensed by the sensor 60.

The noise removal section 158 removes noise from the first sensing information and the second sensing information (step S5). In more detail, when the predetermined image signal value is equal to or smaller than a predetermined value (value close to zero, value which is 50% of the average luminance value at the center of the sensing image of the all-white image, or the like), the noise removal section 158 updates the sensing information by changing the value to zero.

The difference information generation section 152 generates the difference information (pixel unit difference value information) which shows the difference value between the first sensing information for each pixel and the second sensing information for the corresponding pixel based on the first sensing information when sensing the all-white image from which the noise is removed and the second sensing information when sensing the all-black image from which the noise is removed, and stores the difference information in the sensing information storage section 184 (step S6). This difference information is shown by a two-dimensional array or the like. In this embodiment, a two-dimensional array is employed as the difference information.

The difference information generation section 152 may further generate the difference information (temporary projection region pixel unit difference value information) consisting only of the difference values in a temporary projection region which is temporarily set as the projection region 220 based on the difference information. In more detail, the difference information generation section 152 may generate the difference information (temporary projection region pixel unit difference value information) by retaining the difference values for only pixels of which the difference value is equal to or greater than a predetermined threshold value, and updating the difference values for pixels of which the difference value is less than the threshold value to zero.

The endpoint detection section 154 detects the endpoints (coordinate positions of four corners) of the projection region 220 in the sensing region 210 based on the difference information (step S7). In more detail, the endpoint detection section 154 sets a direction at an angle of 45° upward from an element at the center of the two-dimensional array, which is the difference information, as a moving direction of a search line, sets a line which intersects the moving direction at right angles as the search line, and determines whether or not the difference value stored in each element corresponding to the search line is zero. The endpoint detection section 154 determines whether or not the difference value stored in each element is zero while moving the search line in the moving direction.

When the endpoint detection section 154 detects an element whose difference value is zero, the endpoint detection section 154 detects an element having the maximum difference value among the elements on the search line immediately before the present search line as the endpoint (one of four corners). The endpoint detection section 154 detects the remaining three endpoints by performing the determination processing while changing the moving direction at an angle of 135°, 225°, and 315°.

The endpoint detection section 154 can determine the positions of the four corner points in the sensing region 210 by using the four corner points determined in the two-dimensional array and the sensing information.

When the projector 20 detects the endpoints, the projector 20 may detect the endpoints by generating pixel block preprocessing information for extracting the projection region 220. The processing in the case of detecting the endpoints by generating the pixel block preprocessing information is described below.

Figure 6:
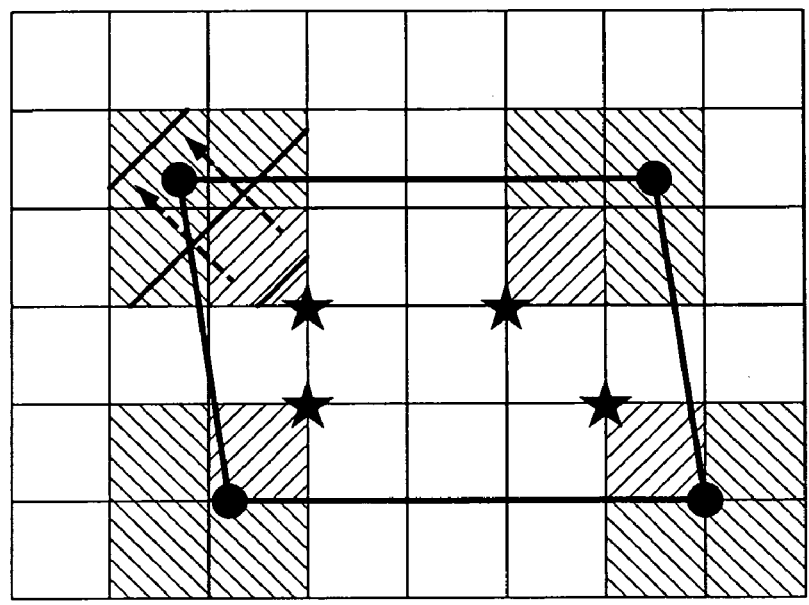
FIG. 6 is a schematic diagram of a pixel block for preprocessing in the first embodiment.
Figure 6:
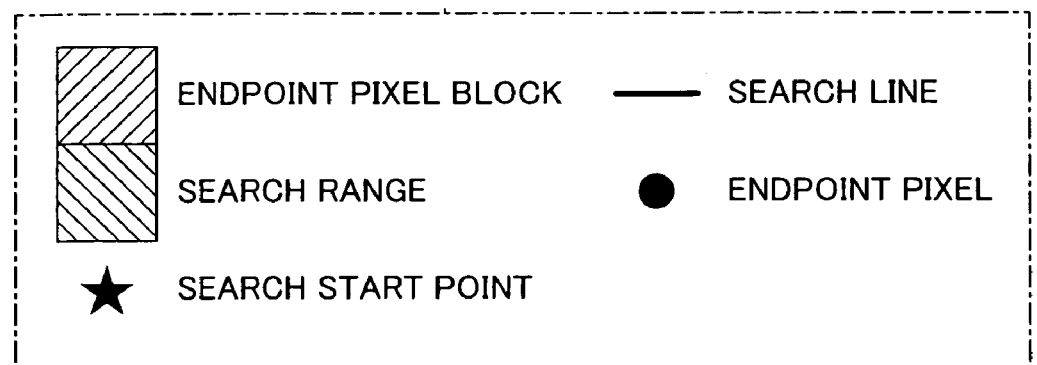

FIG. 6 is a schematic diagram of pixel blocks for preprocessing in the first embodiment.

After the processing in the step S5 shown in FIG. 5 has been completed, the difference information generation section 152 divides the sensing region 210 into a predetermined number of pixel blocks. In the example shown in FIG. 6, the number of pixel blocks is 6 (vertical direction)×8 (horizontal direction)=48.

The difference information generation section 152 calculates the average value of the predetermined image signal values of the pixels which make up the pixel block for each pixel block based on the first sensing information and the second sensing information after noise removal, generates first pixel block preprocessing information and second pixel block preprocessing information in which the average value is the value of the pixel block, and stores the pixel block preprocessing information in the sensing information storage section 184. The pixel block preprocessing information is information including the pixel block position (identification number or coordinate position, for example) and the average value of the pixel block, for example.

The difference information generation section 152 calculates the ratio or the difference value of the average values of the corresponding pixel blocks in the pixel block preprocessing information based on the first pixel block preprocessing information and the second pixel block preprocessing information, and sets up a region consisting of the pixel blocks of which the value exceeds a predetermined threshold value as the temporary projection region.

The endpoint detection section 154 performs the same processing as the above-described search processing in the oblique direction based on the pixel block preprocessing information in the temporary projection region. In more detail, the endpoint detection section 154 moves the search line from the pixel block at the center in the oblique moving direction. When the values of all the pixel blocks included in the search line become zero, the endpoint detection section 154 sets up the pixel block having the maximum value among the pixel blocks included in the search line immediately before the present search line as an endpoint pixel block. The endpoint detection section 154 sets up four endpoint pixel blocks by performing this processing four times while changing the moving direction. The endpoint pixel block is a pixel region which becomes the reference for the endpoint of the projection region 220.

As shown in FIG. 6, the endpoint detection section 154 searches the endpoint pixel block and the pixel blocks near the endpoint pixel block (three pixel blocks adjacent to the endpoint pixel block in FIG. 6) as a search range, and detects the endpoint pixel while moving the search line in the oblique direction from the innermost pixel in the endpoint pixel block based on the difference information on the region included in the search range (pixel unit difference value information or temporary projection region pixel unit difference value information).

The endpoint detection section 154 detects the four endpoints (four corner points of the projection region 220) in this manner.

This method is particularly effective for the case where the sensor 60 has high resolution since the processing time can be reduced.

As described above, according to this embodiment, the projector 20 can generate the first sensing information at an exposure conforming to the application environment by generating the first sensing information by sensing the all-white image at the automatic exposure setting. The projector 20 can generate the second sensing information at an exposure suitable for generating the difference information by generating the second sensing information by sensing the all-black image at the exposure determined when sensing the all-white image.

In particular, the sensor 60 can sense an image by effectively utilizing the dynamic range of the sensor 60 by sensing the all-white image at the automatic exposure setting in comparison with the case of sensing an image at a fixed exposure, even when the screen 10 is affected by the external light 80, when the reflected projection light is too weak since the projection distance is too great or the reflectance of the screen 10 is too low, and when the reflected projection light is too strong since the projection distance is too small or the reflectance of the screen 10 is too high.

The projector 20 can more accurately determine the projection region in the sensing region by detecting the endpoints of the projection region 220 in the sensing region based on the first sensing information and the second sensing information.

The endpoint detection section 154 is rarely affected by noise and can more accurately detect the endpoint by searching for the endpoint outward from the center of the two-dimensional array which is the difference information. The endpoint detection section 154 may search for the endpoint inward toward the center of the two-dimensional array.

The projector 20 performs image distortion correction and color non-uniformity correction (including color non-uniformity due to luminance non-uniformity) after detecting the endpoints.

The pixel block image information generation section 156 generates pixel block image information based on the sensing information stored in the sensing information storage section 184, the endpoint position information from the endpoint detection section 154, and information on the image size (p'×q') required by the image distortion correction amount calculation section 162 and the color non-uniformity correction amount calculation section 164. The pixel block image information is described below.

Figure 7:
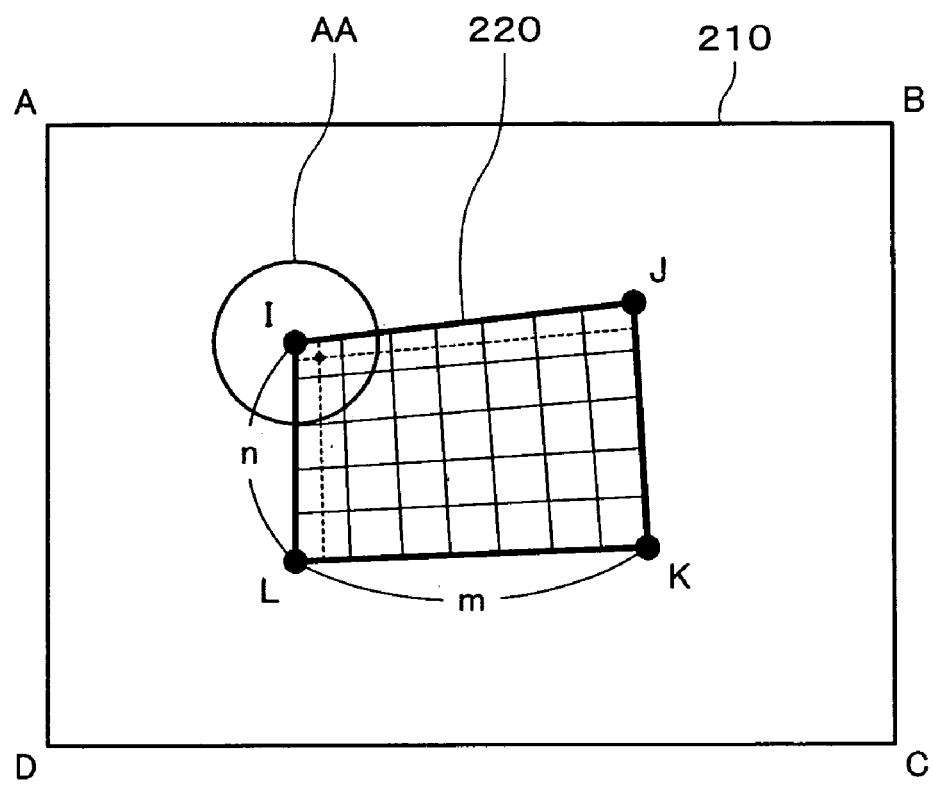
FIG. 7 is a schematic diagram of a pixel block in the first embodiment.
Figure 8:
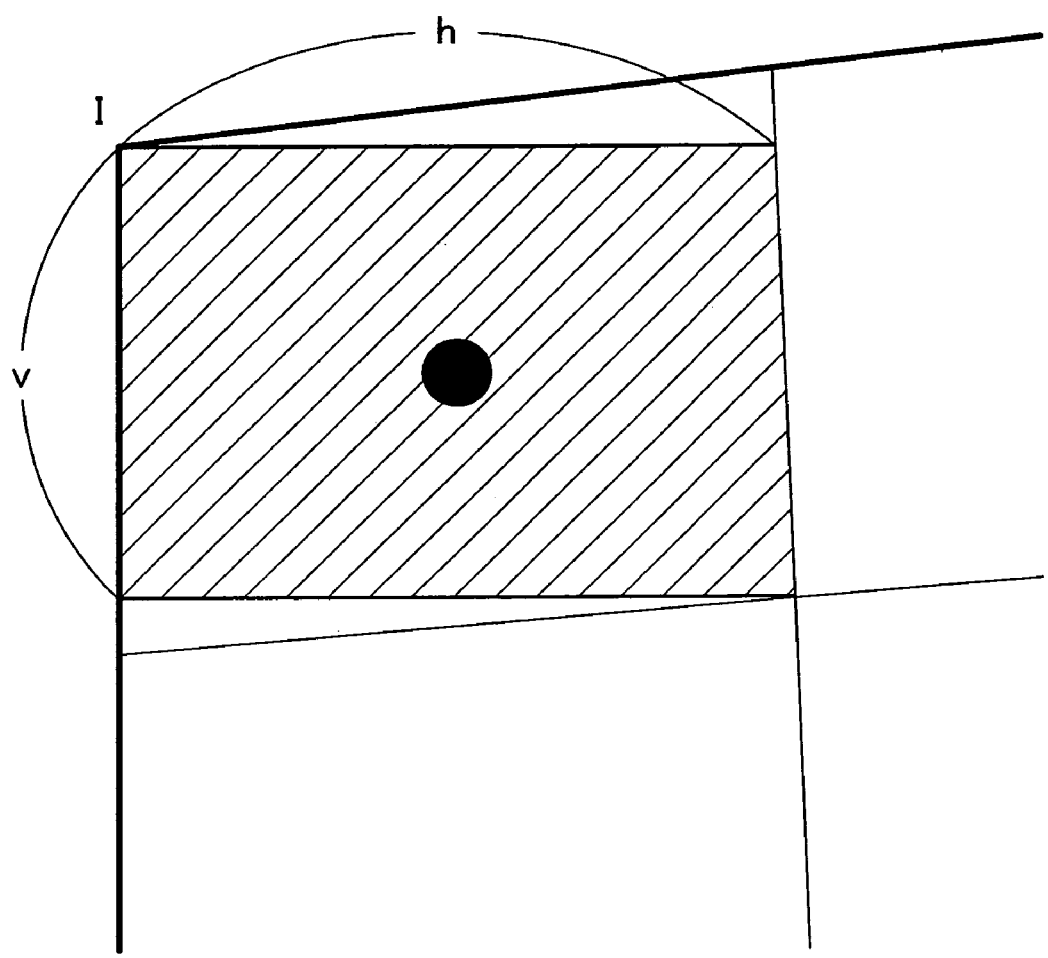
FIG. 8 is a schematic diagram of a pixel block in which a section AA shown in FIG. 7 is enlarged.

FIG. 7 is a schematic diagram of the pixel block in the first embodiment. FIG. 8 is a schematic diagram of the pixel block in which the section AA shown in FIG. 7 is enlarged.

In the example shown in FIG. 7, the projection region 220 is divided into n×m pixel blocks in the vertical direction and the horizontal direction. The number of pixel blocks may be a value corresponding to the processing of the correction means such as the color non-uniformity correction section 130, for example.

The pixel block image information generation section 156 compares the size (p ×q) of the sensing region 210 with the image size (p'×q') required by the image distortion correction amount calculation section 162 and the color non-uniformity correction amount calculation section 164, and converts the coordinates of each endpoint shown by the endpoint position information by calculation in a ratio based on the image size of the latter. The pixel block image information generation section 156 sets up a rectangular region in each pixel block based on the coordinates (p'i, q'i) (i=1 to 4) after conversion, the number of pixel blocks (n×m), and the sensing information, calculates the average value of the predetermined image signal values of the pixels in the rectangular region, and sets the average value as the value of the pixel block.

As shown in FIG. 8, the rectangular region is a region which has a vertical length of v and a horizontal length of h and is placed inside the pixel block. The pixel block image information generation section 156 may set the difference value for the center pixel in the rectangular region indicated by the black circle shown in FIG. 8 as the value of the pixel block or may set the sum of the predetermined image signal values of all the pixels in the rectangular region as the value of the pixel block instead of the average value.

The pixel block image information generation section 156 generates the pixel block image information in which the value of the pixel block is retained in each element of the n×m two-dimensional array by the above-described processing, and stores the pixel block image information in the sensing information storage section 184.

The image distortion correction amount calculation section 162 determines a change in the predetermined image signal value in the projection region 220 based on the pixel block image information of the all-white image stored in the sensing information storage section 184. The image distortion correction amount calculation section 162 determines distortion of the projection region 12 based on the change, and calculates the image distortion correction amount.

For example, when the image signal value on the left of the projection region 12 is greater, the image distortion correction amount calculation section 162 determines that the projection optical axis is shifted to the left from the center of the projection region 12, and determines that the projection region 12 is distorted in the shape of a trapezoid in which the left side is shorter and the right side is longer.

The image distortion correction section 112 generates digital RGB signals by correcting the digital RGB signals generated by converting the analog RGB signals based on the image distortion correction amount from the image distortion correction amount calculation section 162 so as to correct the image distortion.

This enables the projector 20 to correct the image distortion.

The color non-uniformity correction amount calculation section 164 calculates the correction amount of input/output characteristic data for each pixel block based on the pixel block image information. In the case of correcting color non-uniformity, the calibration information generation section 172 may generate image signals for displaying a primary color calibration image of R, G, and B in addition to the all-white image and the all-black image, the image projection section 190 may project the primary color calibration image, and the sensor 60 may generate the sensing information by sensing the primary color calibration image projected onto the screen 10.

In more detail, the color non-uniformity correction amount calculation section 164 calculates the correction amount so that the slope of the straight line which shows the input/output characteristics after correction becomes one, for example.

The input/output characteristic data is data which shows the input/output characteristics and shows the relationship between the brightness index value (grayscale value, for example) of an input signal and the brightness index value of an output signal. The brightness index value is a value which becomes an index of brightness. In more detail, the brightness index value refers to luminance, illuminance, a color information value (digital signal value of R signal or the like), a grayscale value, and values obtained by transforming these values by normalization or the like, for example.

The color non-uniformity correction section 130 corrects the input/output characteristic data based on the color non-uniformity correction amount from the color non-uniformity correction amount calculation section 164, and corrects the RGB signals based on the input/output characteristic data so as to correct color non-uniformity of the image.

The image projection section 190 projects an image of which distortion and color non-uniformity are corrected by the above-described procedure.

Therefore, according to this embodiment, since the projector 20 can accurately detect the four corners of the projection region 220, the coordinates of the projection region 220 in the sensing region can be accurately and efficiently associated with the coordinates of the display element of the spatial light modulator 192. Therefore, the projector 20 can appropriately correct distortion even if keystone distortion occurs in the image.

According to this embodiment, since the projector 20 can determine the difference in color of each image block using the image block, color non-uniformity due to deterioration with time, environmental influence (in the case where the external light 80 exists or in the case where non-uniformity occurs since the screen 10 is colored, for example), and the like can be appropriately corrected.

Second Embodiment

A method for detecting the endpoints of the projection region using a patterned image is described below.

Figure 9:
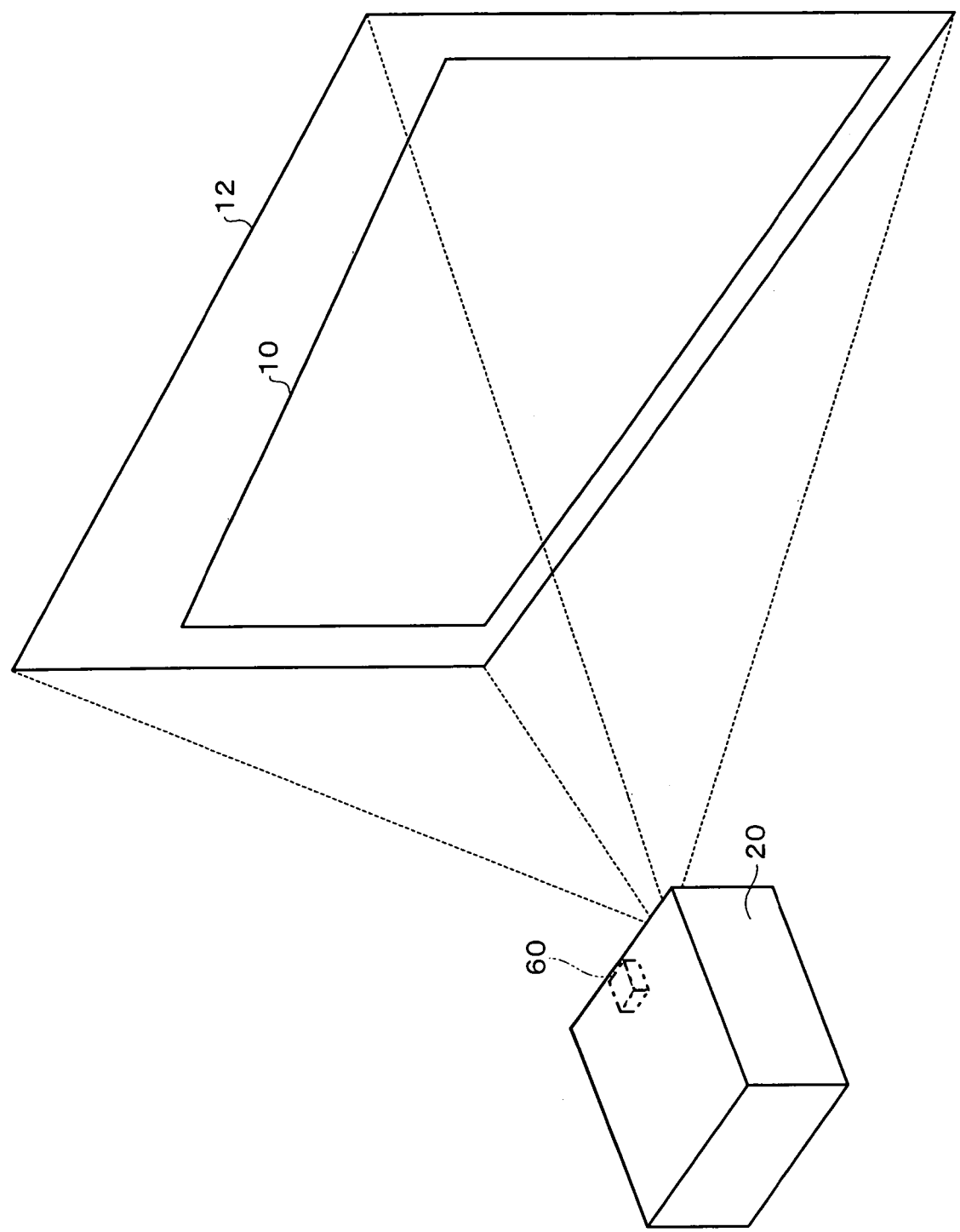
FIG. 9 is a schematic diagram showing an image projection state in a second embodiment.

FIG. 9 is a schematic diagram showing an image projection state in the second embodiment.

The projector 20 projects an image onto the screen 10. The projection image 12 is displayed on the screen 10.

The projector 20 in this embodiment includes the sensor 60 which is the sensing means. The sensor 60 generates the sensing information by sensing the screen 10 on which the projected image 12 is displayed through the sensing plane. The projector 20 adjusts distortion and the display position of the projected image 12 based on the sensing information.

However, in the case where the peripheral section of the projected image 12 is displayed outside the screen 10 as shown in FIG. 9, a conventional projector cannot adjust distortion and the display position of the projected image 12 based on the sensing information.

This is because, even if the screen 10 is disposed at a distance from a wall behind the screen 10 and the projected image 12 is within the sensing range of the sensor 60, a conventional projector cannot convert the positions of the vertices of the projected image 12 which are displayed on the wall or a background object of which the position is unknown, or are not displayed, into the positions on the plane of the screen 10.

The projector 20 in this embodiment accurately determines the position of the projected image 12 under conditions wider than conventional conditions by using a calibration image differing from a conventional calibration image and performing simple search processing based on the sensing information of the calibration image.

Functional blocks of the projector 20 for implementing such a function are described below.

Figure 10:
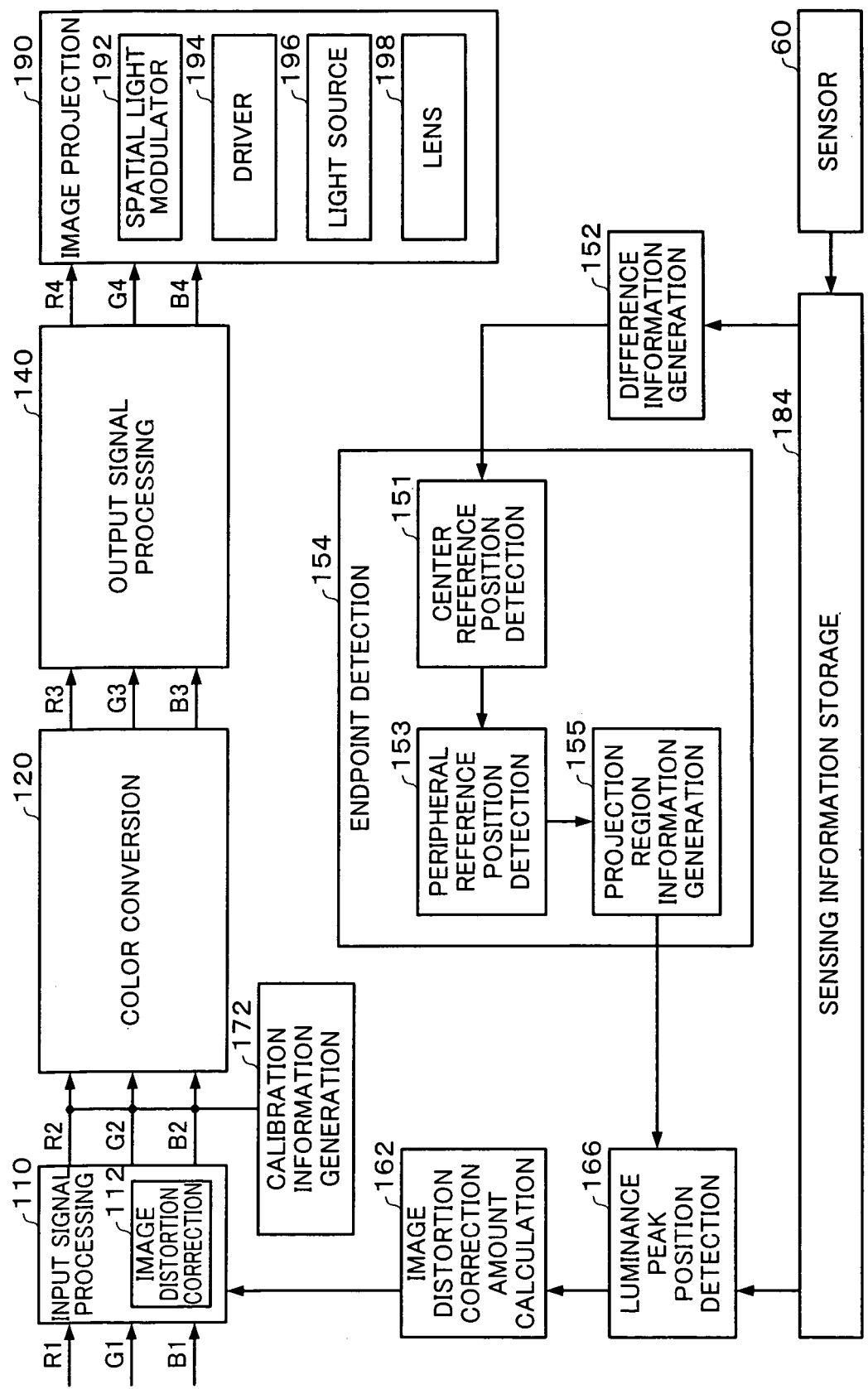
FIG. 10 is a functional block diagram of a projector in the second embodiment.

FIG. 10 is a functional block diagram of the projector 20 in the second embodiment.

The configuration of the projector 20 is the same as in the first embodiment.

The difference information generation section 152 in the second embodiment generates a differential image between a first sensing image shown by the first sensing information and a second sensing image shown by the second sensing information as the difference information.

The endpoint detection section 154 in the second embodiment includes a center reference position detection section 151 which detects a plurality of center reference positions of a center block region included in the differential image, a peripheral reference position detection section 153 which detects a plurality of peripheral reference positions of a peripheral block region included in the differential image, and a projection region information generation section 155 which generates projection region information which shows the positions of the endpoints (vertices in this embodiment) of the projection region based on each reference position.

The projector 20 has a function of correcting distortion of the projected image 12. In order to implement this function, the projector 20 includes a luminance peak position detection section 166 which detects a luminance peak position (position of a pixel having the greatest luminance value) in the projection region based on the sensing information and the projection region information, the image distortion correction amount calculation section 162 which calculates the image distortion correction amount based on the luminance peak position, and the image distortion correction section 112 which corrects input image signals based on the image distortion correction amount so as to correct distortion of the projected image 12.

As hardware for implementing the function of each section of the projector 20, the hardware shown in FIG. 4 may be applied, for example.

A flow of projection region position detection processing using these sections is described below.

Figure 11:
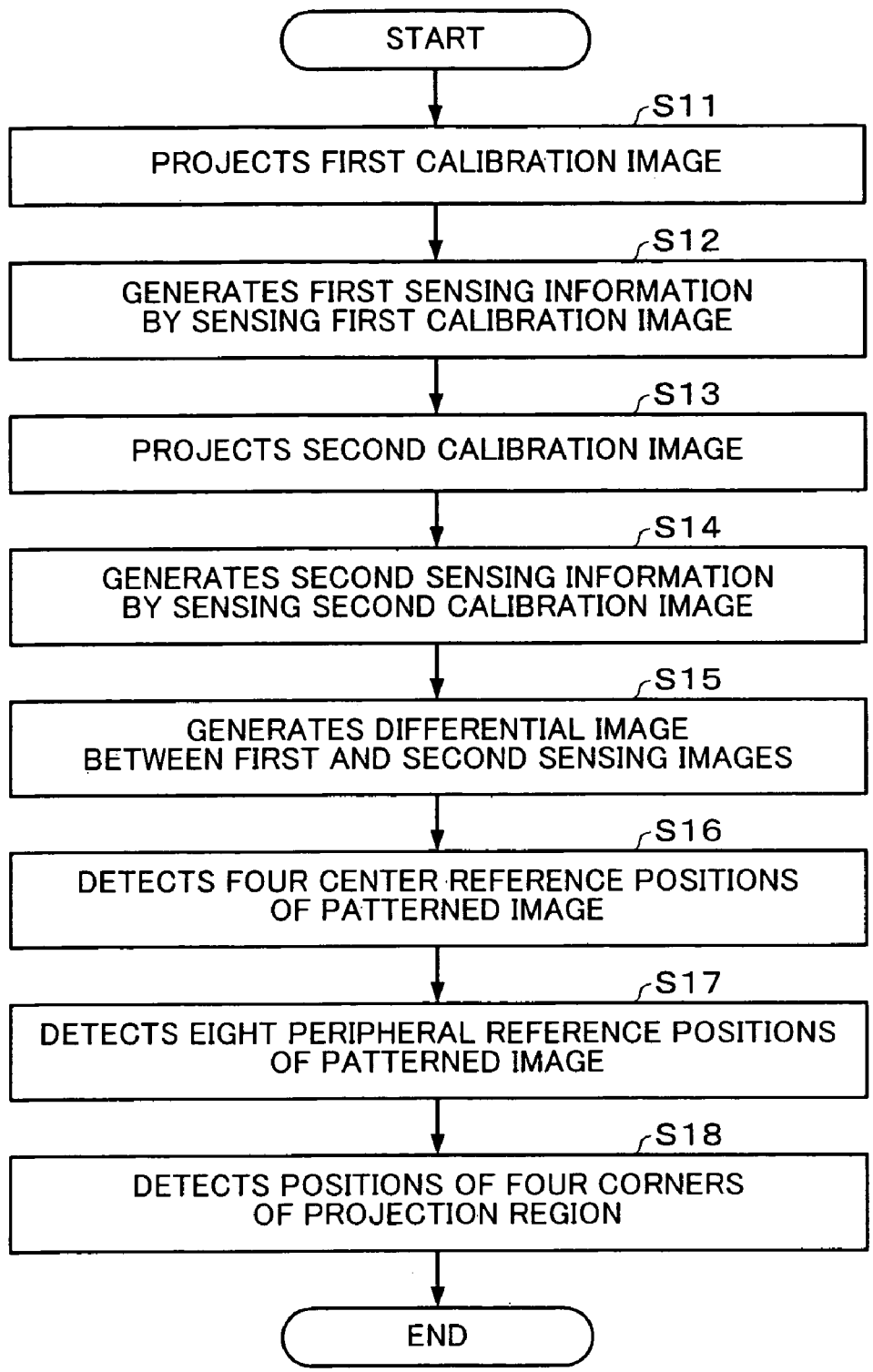
FIG. 11 is a flowchart showing a flow of projection region position detection processing in the second embodiment.
Figure 12A:
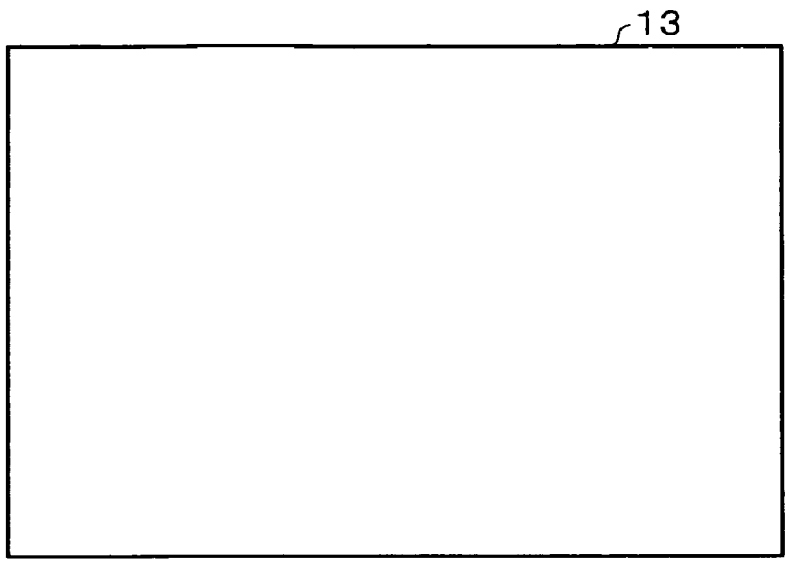
FIG. 12A is a schematic diagram of a first calibration image.

FIG. 11 is a flowchart showing a flow of projection region position detection processing in the second embodiment. FIG. 12A is a schematic diagram of a first calibration image 13, and FIG. 12B is a schematic diagram of a second calibration image 14.

The projector 20 projects the all-white calibration image (entire image is white) shown in FIG. 12A as the first calibration image 13 (step S11). In more detail, the calibration information generation section 172 generates calibration information (RGB signals, for example) for the first calibration image 13, and the image projection section 190 projects the all-white calibration image based on the calibration information.

The sensor 60 generates the first sensing information by sensing the first calibration image 13 on the screen 10 at the automatic exposure setting (step S12). The sensing information storage section 184 stores the first sensing information.

Figure 12B:
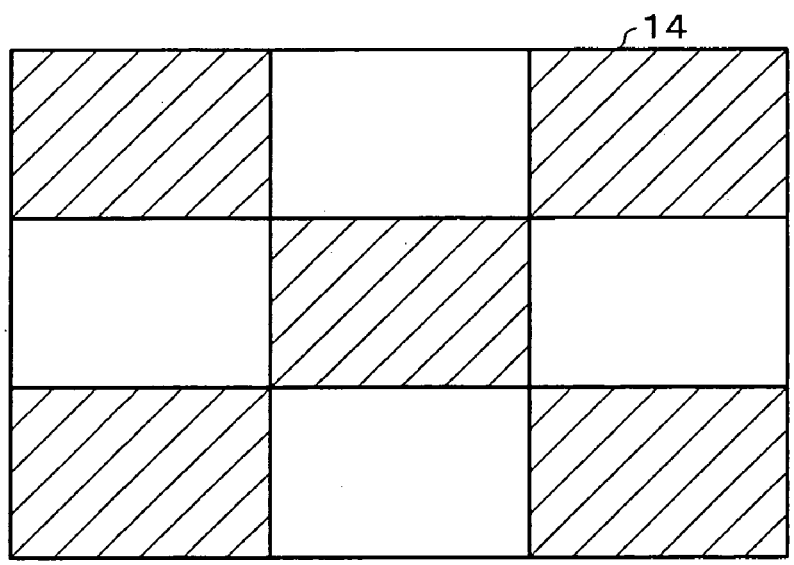
FIG. 12B is a schematic diagram of a second calibration image.

The projector 20 projects the second calibration image 14 shown in FIG. 12B as the second calibration image 14 (step S13). In more detail, the calibration information generation section 172 generates calibration information for the second calibration image 14, and the image projection section 190 projects the second calibration image 14 based on the calibration information.

In this embodiment, the second calibration image 14 is a patterned image in a checkered pattern in which, when the entire image is equally divided into nine blocks, the center block region and four peripheral block regions at the four corners are black and the remaining block regions are white.

The sensor 60 generates the second sensing information by sensing the second calibration image 14 on the screen 10 at the exposure determined when sensing the first calibration image 13 (step S14). The sensing information storage section 184 stores the second sensing information.

The difference information generation section 152 generates a differential image between the first calibration image 13 and the second calibration image 14 based on the first sensing information and the second sensing information (step S15). The differential image is an image generated by calculating the difference in the luminance value or the like for each pixel, for example. The differential image is an image in which a pixel of which the difference value is equal to or greater than a predetermined threshold value has the difference value as the value of the pixel position, and a pixel of which the difference value is less than the predetermined threshold value has zero as the value of the pixel position, for example. The difference information generation section 152 does not necessarily calculate the differences over the entire image, and may calculate the differences only in the range (part of the image) necessary for the subsequent processing.

After the differential image has been generated, the endpoint detection section 154 detects a plurality of (four in this embodiment) center reference positions of the center block region included in the differential image and a plurality of (eight in this embodiment) peripheral reference positions of the peripheral block region included in the differential image.

Figure 13:
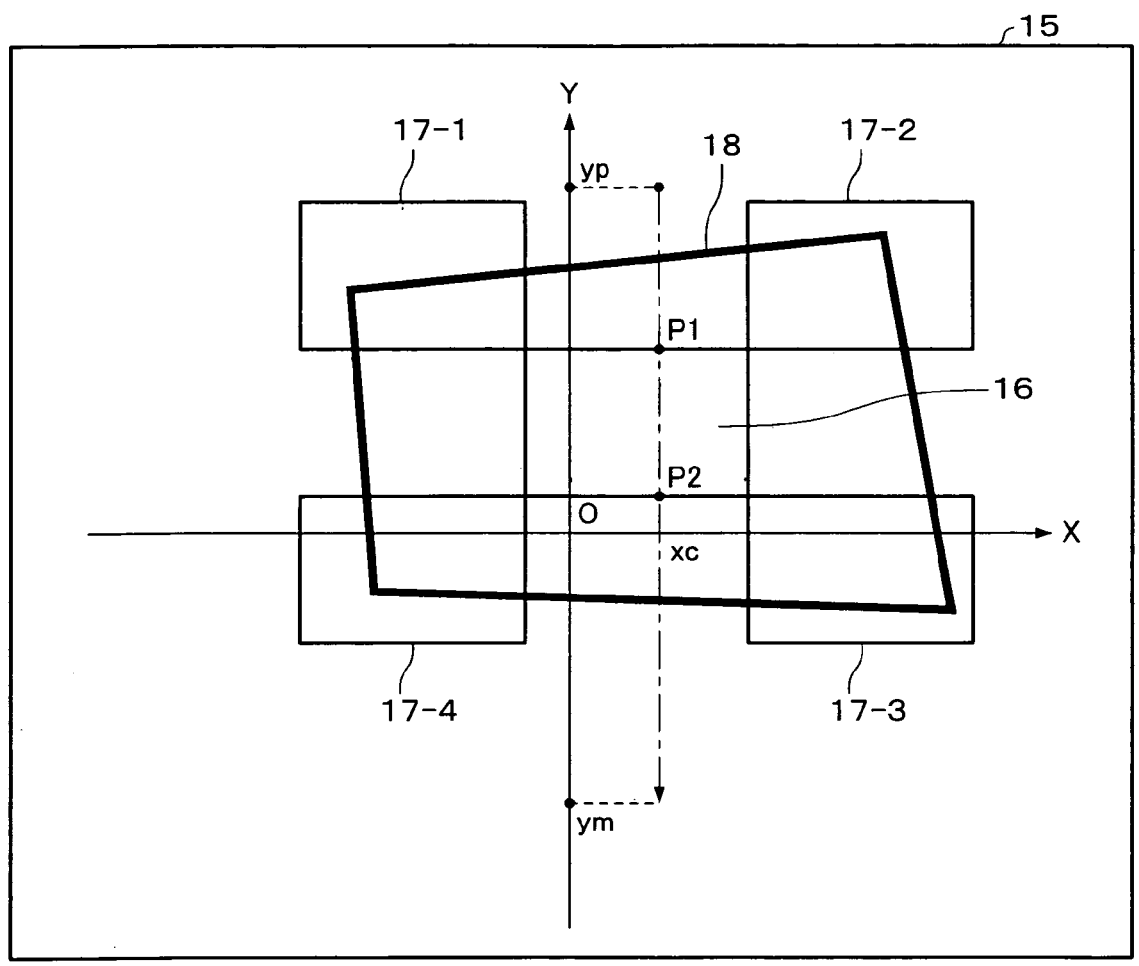
FIG. 13 is a schematic diagram showing a search method in a first stage when detecting center reference positions in the second embodiment.
Figure 14:
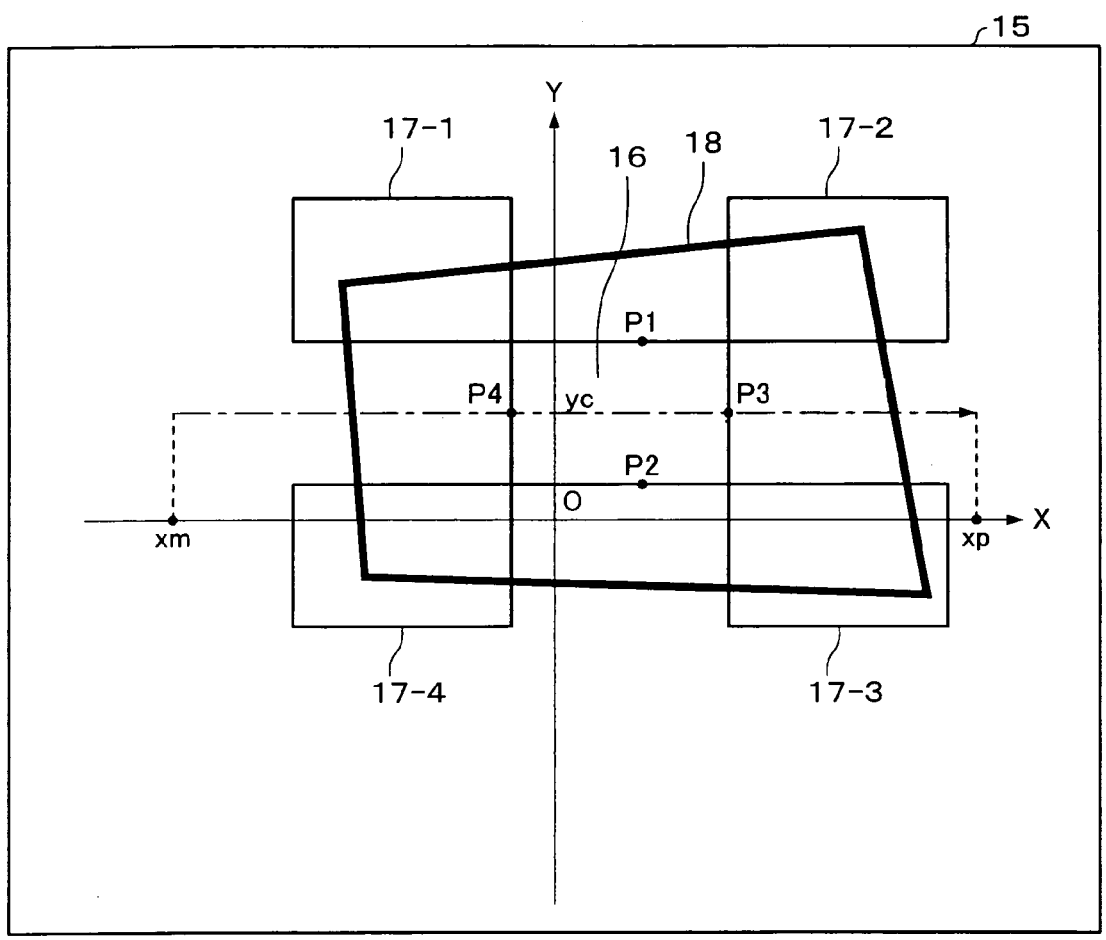
FIG. 14 is a schematic diagram showing a search method in a second stage when detecting center reference positions in the second embodiment.

FIG. 13 is a schematic diagram showing a search method in the first stage when detecting the center reference positions in the second embodiment. FIG. 14 is a schematic diagram showing a search method in the second stage when detecting the center reference positions in the second embodiment.

The center reference position detection section 151 detects four center reference positions of the patterned image so as to detect the position of the projection region (region corresponding to the projected image 12) in a sensing region 15 corresponding to the sensing plane (step S16). A screen region 18 is drawn in each drawing so that the description is readily understood. However, a part of the screen region 18 or peripheral block regions 17-1 to 17-4 outside the screen region 18 may not be included in the actual differential image.

Figure 16:
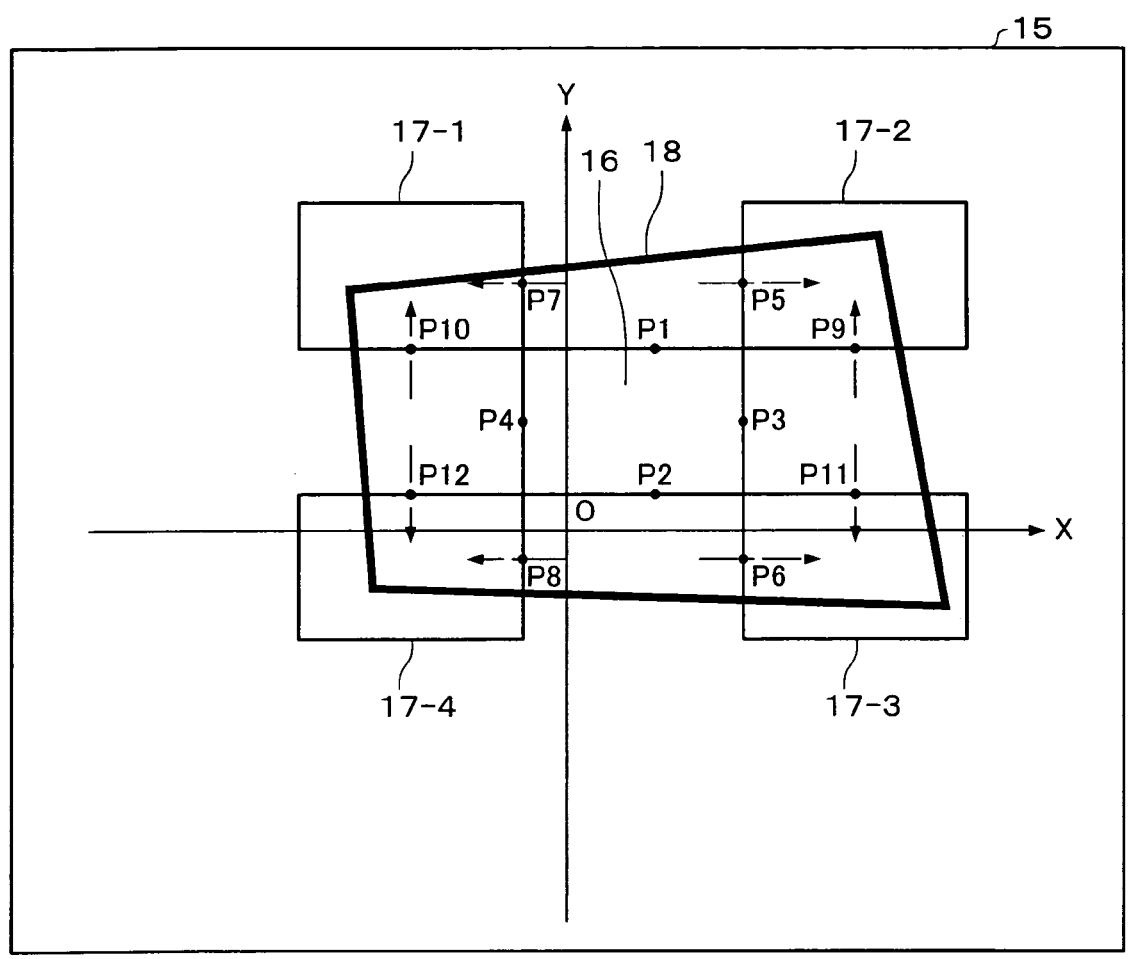
FIG. 16 is a schematic diagram showing a search method in a second stage when detecting peripheral reference positions in the second embodiment.

In more detail, the center reference position detection section 151 determines points P1 and P2 at which the difference value changes by searching for the difference value in the differential image at the vertical position x=xc at which the center block region 16 is expected to be positioned from y=yp to y=ym in pixel units, as shown in FIG. 16. For example, it is assumed that P1(xc, y1) and P2(xc, y2).

The value of the search reference position such as xc, yp, or ym may be determined by the angle of view and the position of each of the lens 198 and the sensor 60, may be determined by experiments, or may be determined corresponding to the sensing result. This also applies to other search reference positions described later.

As shown in FIG. 14, the center reference position detection section 151 determines points P4 and P3 at which the difference value changes by searching for the difference value in pixel units from x=xm to x=xp at the horizontal position y=yc based on the points P1 and P2. yc equals (y1+y2)/2, for example.

The center reference position detection section 151 outputs center reference position information which shows the four center reference positions P1 (xc, y1), P2(xc, y2), P3(x1, yc), and P4(x2, yc) of the center block region 16 to the peripheral reference position detection section 153.

The peripheral reference position detection section 153 detects eight peripheral reference positions of the patterned image based on the center reference position information (step S17).

Figure 15:
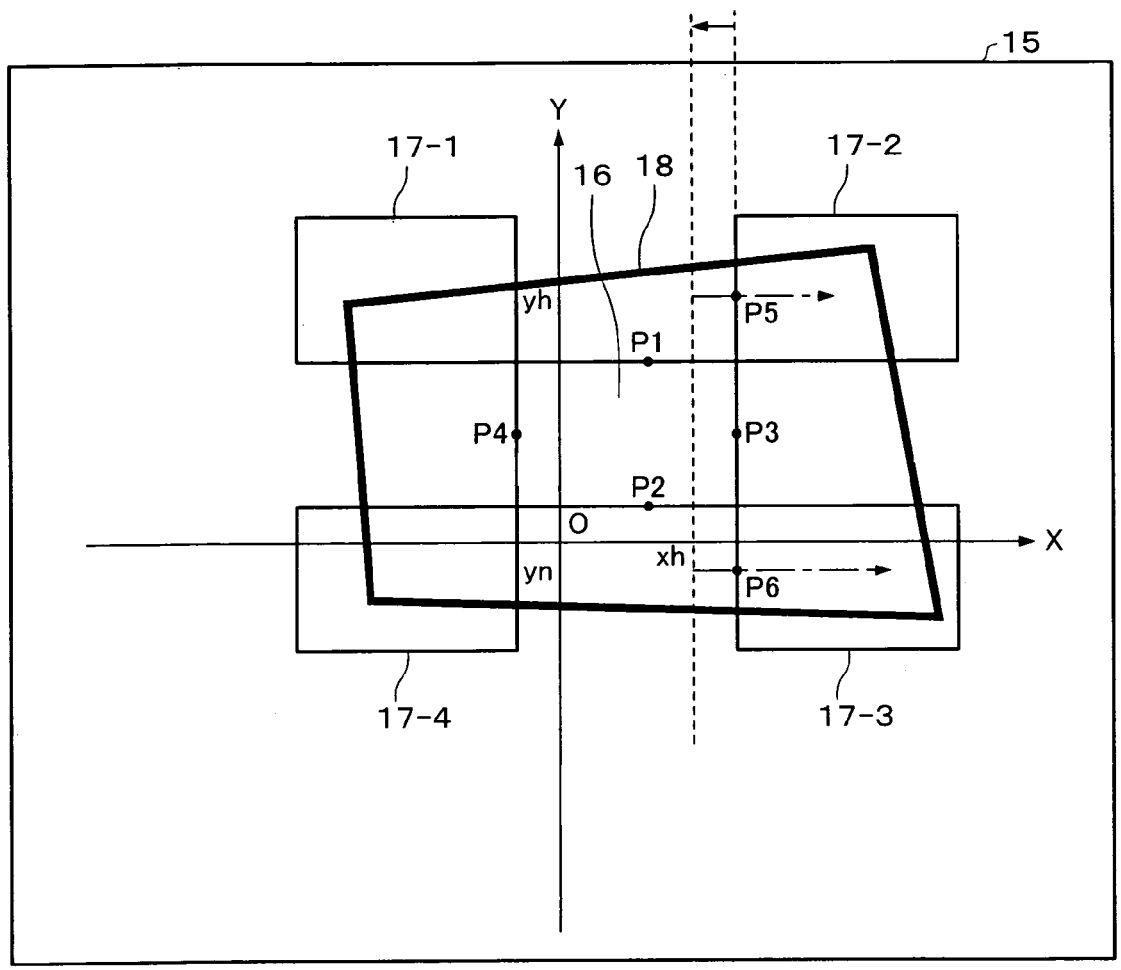
FIG. 15 is a schematic diagram showing a search method in a first stage when detecting peripheral reference positions in the second embodiment.

FIG. 15 is a schematic diagram showing a search method in the first stage when detecting the peripheral reference positions in the second embodiment. FIG. 16 is a schematic diagram showing a search method in the second stage when detecting the peripheral reference positions in the second embodiment.

In more detail, the peripheral reference position detection section 153 searches for a point at which the difference value of each pixel in the differential image changes on y=yh which is m% above the y coordinate y1 of the point P1 from the x coordinate xh which is n% inward from the x coordinate x1 of the point P3 in the positive direction of the x axis. This allows a point P5 at which the difference value changes to be determined.

The peripheral reference position detection section 153 searches for a point at which the difference value of each pixel in the differential image changes on y=yn which is m% below the y coordinate y2 of the point P2 from the x coordinate xh in the positive direction of the x axis. This allows a point P6 at which the difference value changes to be determined.

As shown in FIG. 16, points P7 to P12 are determined in the same manner as described above. The peripheral reference position detection section 153 outputs the peripheral reference position information which indicates the coordinates of the eight points and the center reference position information to the projection region information generation section 155.

The projection region information generation section 155 detects the positions of the four corners of the projection region using an approximation line (may be approximation curve) based on the peripheral reference position information and the center reference position information (step S18).

Figure 17:
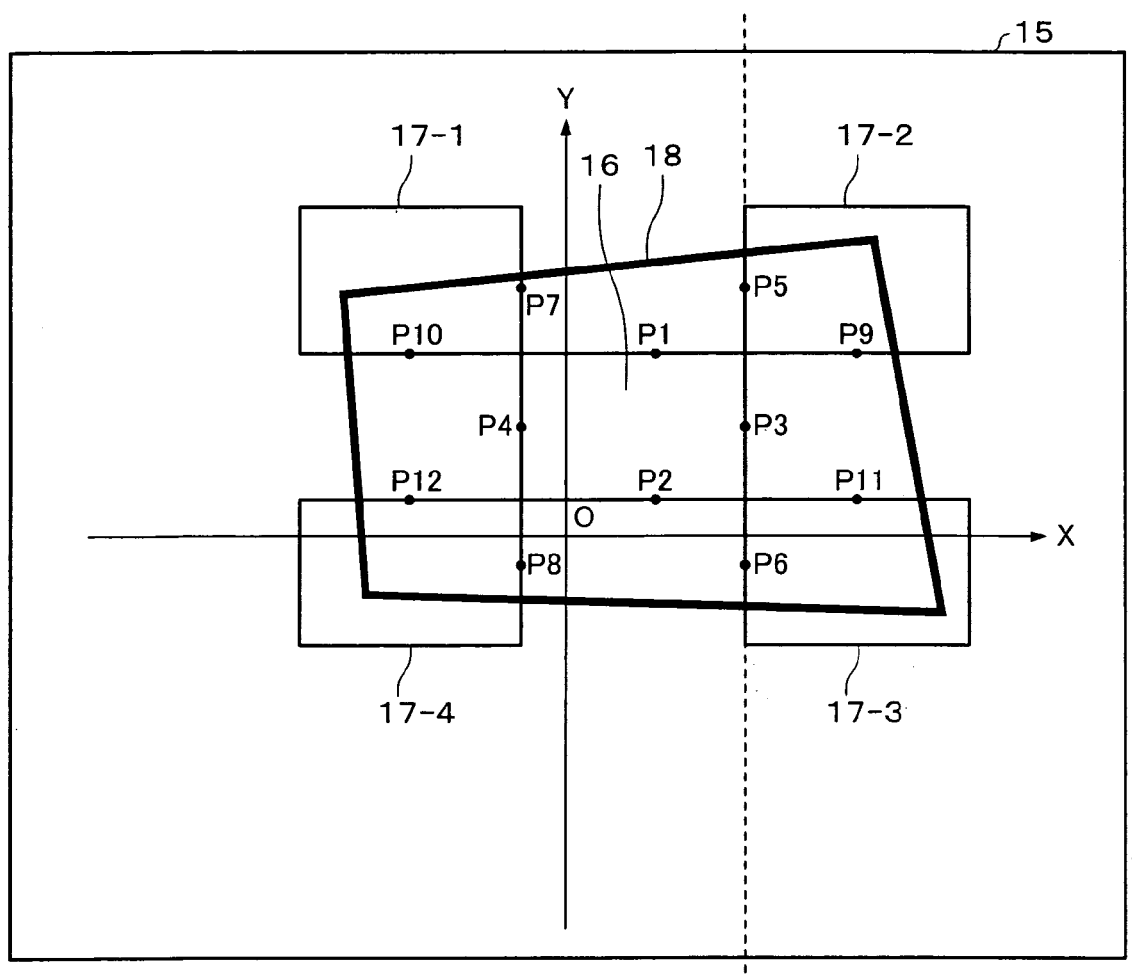
FIG. 17 is a schematic diagram showing a first stage when setting an approximation line in the second embodiment.
Figure 18:
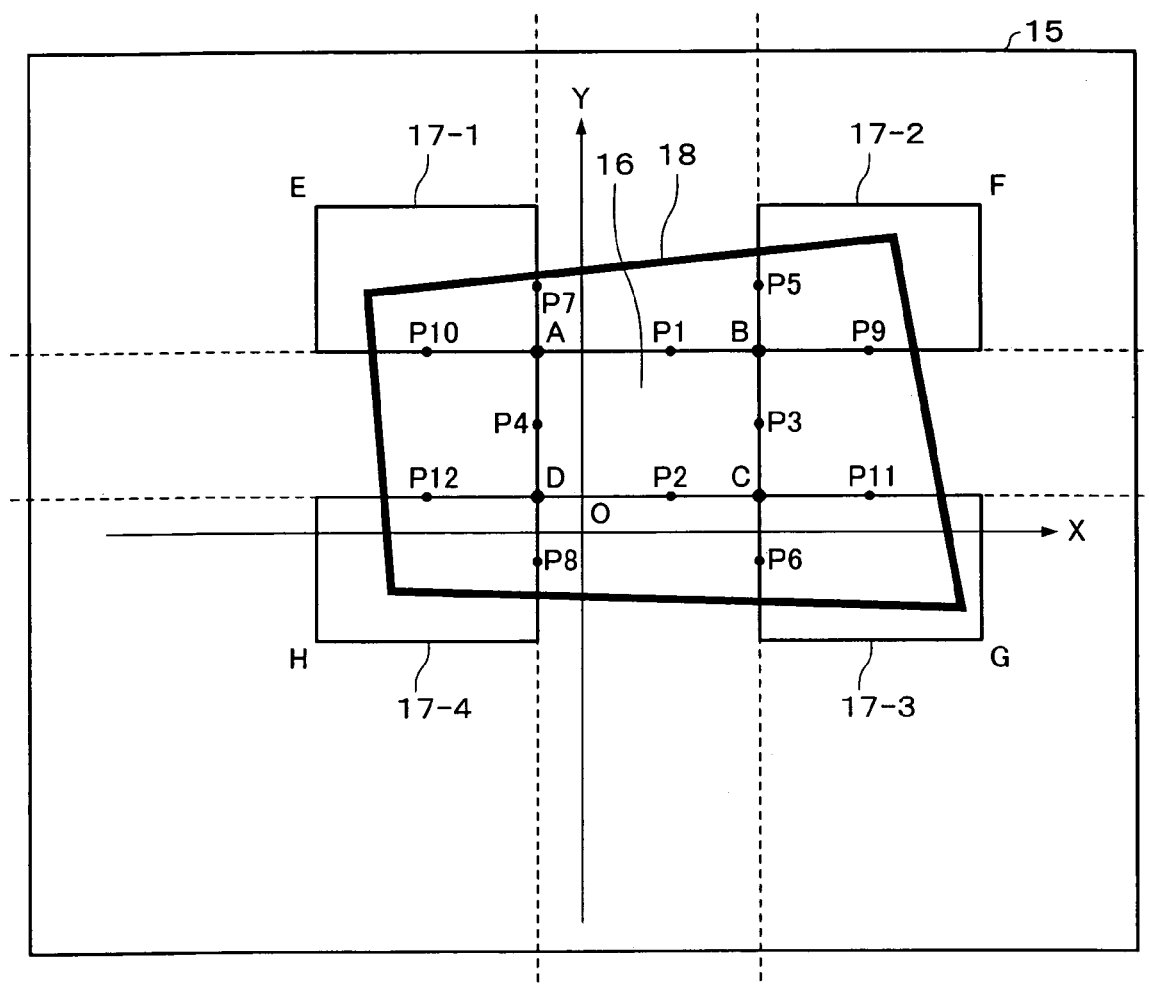
FIG. 18 is a schematic diagram showing a second stage when setting an approximation line in the second embodiment.

FIG. 17 is a schematic diagram showing the first stage when setting the approximation line in the second embodiment. FIG. 18 is a schematic diagram showing the second stage when setting the approximation line in the second embodiment.

The projection region information generation section 155 sets an approximation line indicated by the dashed line shown in FIG. 17 based on the coordinates of the points P5, P3, and P6. As shown in FIG. 18, the projection region information generation section 155 sets four approximation lines indicated by the dashed lines by the same method as described above, and determines the four intersecting points A(xA, yA) to D(xD, yD) of each approximation line as the four corner points of the center block region 16.

Since the center block region 16 is a region corresponding to an image obtained by reducing the original projected image 12 by ⅕, four corner points E, F, G, and H of the projection region corresponding to the projected image 12 are expressed as follows. Specifically, $E(xE, yE)=(2*xA-xC, 2* yA-yc)$, $F(xF, yF)=(2*xB-xD, 2*yB-yD)$, $G(xG, yG)=(2*xC-xA, 2*yC-yA)$, and $H(xH, yH)=(2*xD-xB, 2*yD-yB)$.

As described above, according to this embodiment, the projector 20 can detect the positions of the four corners of the projection region in the sensing region 15, even in the case where a part of the projected image 12 is displayed outside the screen 10, in addition to the case where the projected image 12 is included in the screen 10. The projector 20 can also generate the position information on the four corners of the projected image 12 by converting the position information on the projection region into the position on the plane of the screen 10.

This enables the projector 20 to appropriately perform distortion correction and position adjustment of the projected image 12, detection of the indication position in the projected image 12 using a laser pointer or the like, and the like.

In the case of performing distortion correction of the projected image 12 (keystone correction), the projector 20 detects the luminance peak position at which the luminance value is the highest in the projection region in the sensing region using the luminance peak position detection section 166 based on the sensing information of the first calibration image 13 and the projection region information which shows the positions of the four corners of the projection region from the projection region information generation section 155.

When the screen 10 is disposed perpendicular to the projector 20, the center of the projection region is the luminance peak position, for example. When the luminance value on the left of the projection region is higher, the projection optical axis can be determined to be shifted to the left from the center of the projected image 12, whereby it is determined that the projected image 12 is distorted in the shape of a trapezoid in which the left side is shorter and the right side is longer. The image distortion can be determined by determining the luminance peak position in the projection region.

The image distortion correction amount calculation section 162 calculates the correction amount corresponding to image distortion based on the luminance peak position in the projection region.

The image distortion correction section 112 in the input signal processing section 110 corrects the input image signal based on the correction amount so as to correct image distortion.

The projector 20 can correct image distortion by the above-described procedure, even if a part of the projected image 12 is displayed outside the screen 10. The image distortion correction method is not limited to this method. For example, the projector 20 may detect a pixel having the largest luminance value in the sensing image, and correct image distortion based on the position of the pixel.

The projector 20 can more accurately determine the four corners of the projection region by using an image which has features not only at the center but also on the periphery as in the patterned image shown in FIG. 12B in comparison with the case of using a patterned image which has a feature only at the center.

For example, when determining the points P1 and P2 shown in FIG. 13, the projector 20 can also determine points near the points P1 and P2 at which the luminance value changes. However, in the case of setting the approximation line using a plurality of points at small intervals, the approximation line is greatly affected by an error of one pixel at the point which becomes the approximation line in comparison with the case of setting the approximation line using a plurality of points at large intervals.

In this embodiment, since the projector 20 can set the approximation lines using a plurality of point at large intervals by using the reference points of the center block region 16 and the reference points of the peripheral block regions 17-1 to 17-4, the projector 20 can more accurately determine the four corners of the projection region.

Moreover, the projector 20 can accurately determine the position of the entire projection region while preventing the influence of shading of the projector 20 or the sensor 60.

According to this embodiment, the projector 20 can more easily detect the position of the projection region at higher speed by searching only a necessary region in the differential image instead of searching the entire image.

Moreover, the projector 20 can generate the first sensing information at an exposure conforming to the application environment by generating the first sensing information by sensing the all-white image at the automatic exposure setting when projecting the calibration image. The projector 20 can generate the second sensing information at an exposure suitable for generating the difference information by generating the second sensing information at the exposure determined when sensing the all-white image.

In particular, the sensor 60 can sense an image by effectively utilizing the dynamic range of the sensor 60 by sensing the all-white image at the automatic exposure setting in comparison with the case of sensing an image at a fixed exposure, even when the screen 10 is affected by external light, when the reflected projection light is too weak since the projection distance is too great or the reflectance of the screen 10 is too low, and when the reflected projection light is too strong since the projection distance is too small or the reflectance of the screen 10 is too high.

Modification

The preferred embodiments to which the present invention is applied are described above. However, the application of the present invention is not limited to the above-described embodiments.

In the above-described embodiments, the projector 20 senses an image at the automatic exposure setting when projecting the all-white image, senses an image at the fixed exposure setting when projecting the all-black image, and performs processing of correcting image distortion and color non-uniformity. However, the projector 20 may perform processing other than the processing of correcting image distortion and color non-uniformity.

In the above-described embodiments, the projector 20 generates the difference information using the sensing information of the white calibration image and the black calibration image. However, the projector 20 may project and sense a single-color green calibration image in addition to the above calibration images, generate two types of difference information based on the sensing information on white and black and green and black, and set a region in which the calculation result for the product set (AND) of the two types of difference information is true as the extraction target region of the temporary projection region 230.

This reduces the influence of noise at the time of sensing, whereby the projector 20 can more accurately extract the temporary projection region 230 and the projection region 220. In the above-described embodiments, the projector 20 extracts the projection region 220 after setting the temporary projection region 230. However, the projector 20 may directly extract the projection region 220 from the sensing information.

In the above-described embodiments, the projector 20 uses the information which shows the difference value as the difference information. However, the projector 20 may use information which shows a ratio or the like.

In the above-described embodiments, the projector 20 extracts the temporary projection region 230 by applying the pixel line as the predetermined pixel region. However, the projector 20 may extract the temporary projection region 230 by applying one pixel, a plurality of pixels, a quadrilateral region consisting of a plurality of pixels, or the like as the pixel region.

In the above-described embodiments, the projector 20 uses the vertex as the endpoint. However, the projector 20 may use the midpoint of the side of the target region or the like as the endpoint.

In the above-described embodiments, the projector 20 searches outward from the inner side of the temporary projection region 230. However, the projector 20 may search inward from the outer side of the temporary projection region 230. The search method is arbitrary.

The search procedure is arbitrary. For example, the projector 20 may detect the center reference positions and the peripheral reference positions by searching the differential image in the horizontal direction, and search the differential image in the vertical direction based on the center reference positions and the peripheral reference positions.

The projector 20 may perform various types of processing using the position information of the projection region, such as color non-uniformity correction in the projection region or indication position detection in the projection region, based on the projection region information in addition to image distortion correction based on the projection region information.

The projector 20 may detect the projection region after detecting the screen region 18.

Figure 19:
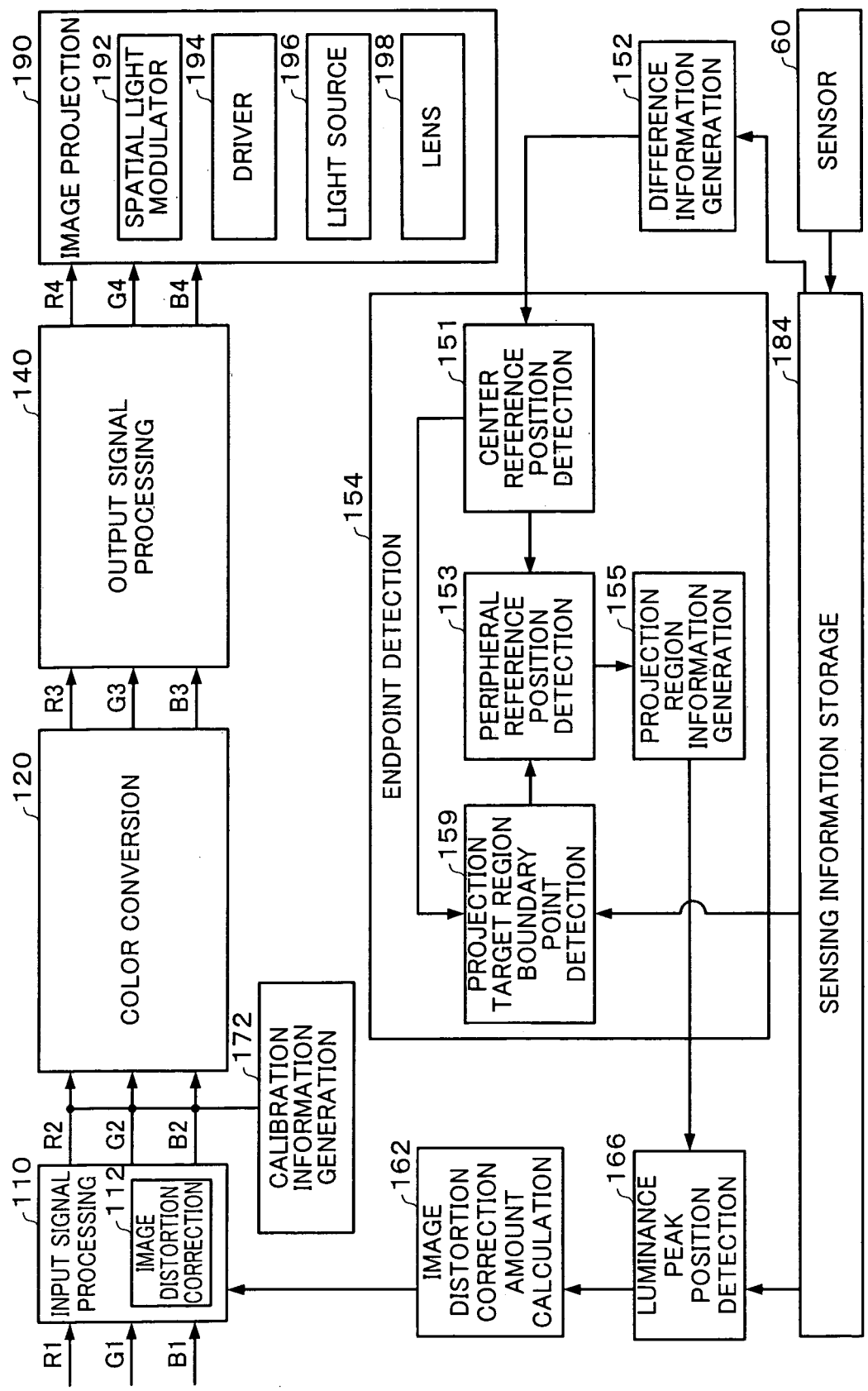
FIG. 19 is a functional block diagram of a projector in a third embodiment.
Figure 20:
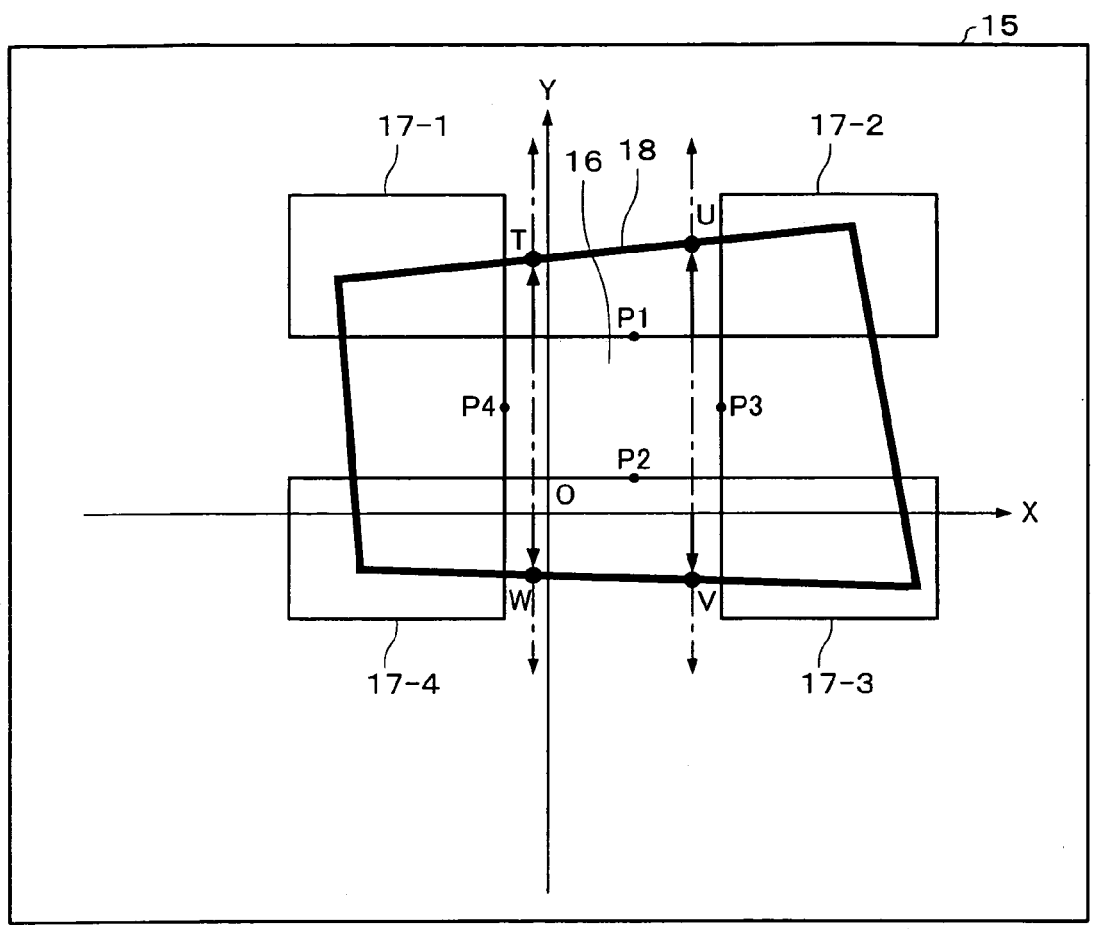
FIG. 20 is a schematic diagram showing a search method in a first stage when detecting peripheral reference positions in the third embodiment.
Figure 21:
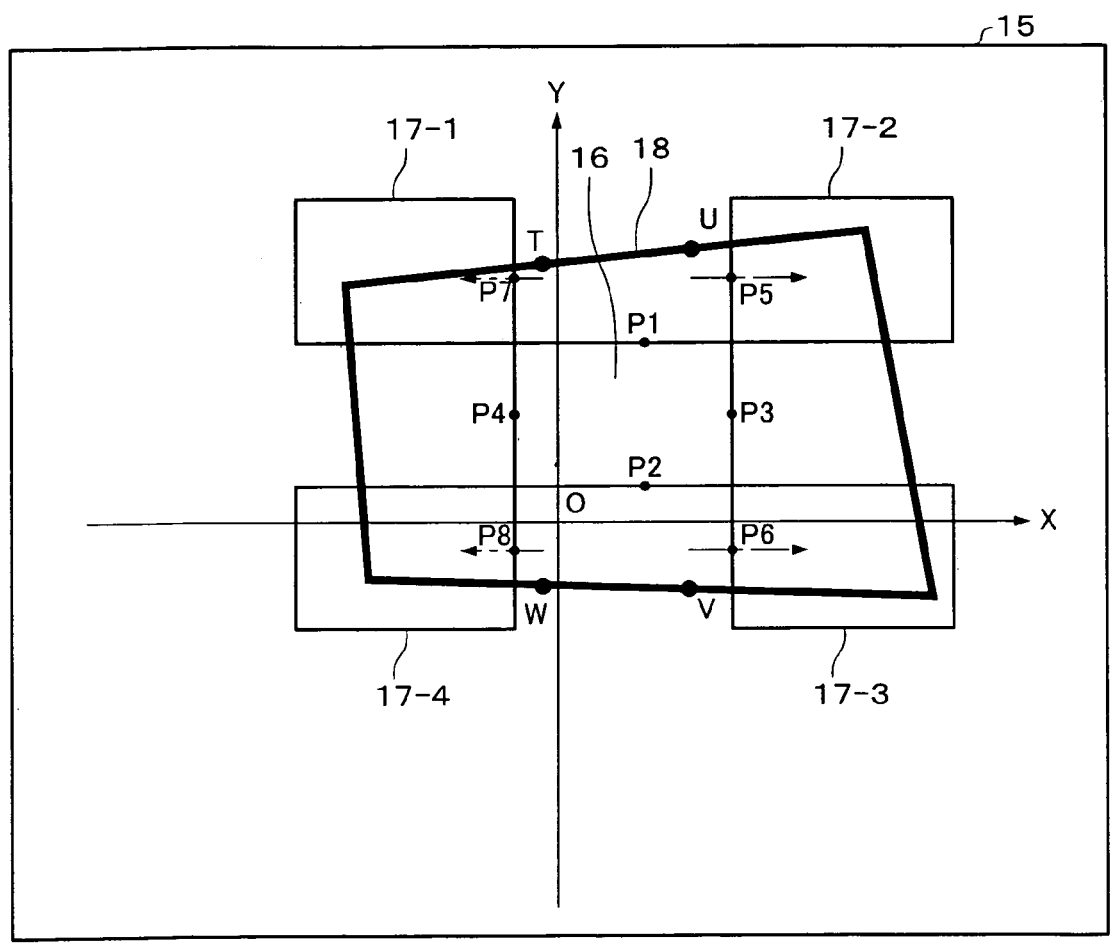
FIG. 21 is a schematic diagram showing a search method in a second stage when detecting peripheral reference positions in the third embodiment.

FIG. 19 is a functional block diagram of the projector 20 in the third embodiment. FIG. 20 is a schematic diagram showing a search method in the first stage when detecting the peripheral reference positions in the third embodiment. FIG. 21 is a schematic diagram showing a search method in the second stage when detecting the peripheral reference positions in the third embodiment.

As shown in FIG. 19, a projection target region boundary point detection section 159 is provided in the endpoint detection section 154, for example.

The center reference position detection section 151 outputs the center reference position information to the projection target region boundary point detection section 159.

As shown in FIG. 20, the projection target region boundary point detection section 159 searches the first sensing image as the search target, and performs edge detection from the intersecting points of the lines which exist inside the center block region 16 in the horizontal direction at a predetermined percentage from each of the points P3 and P4, the line y=y1, and the line y=y2 toward the outside of the center block region 16 for each pixel on the lines which exist inside the center block region 16 at the predetermined percentage. A conventional method is used for edge detection. This allows points T, U, V, and W shown in FIG. 20 to be determined. The projection target region boundary point detection section 159 outputs screen region boundary point information which indicates the positions of the points T, U, V, and W to the peripheral reference position detection section 153.

The peripheral reference position detection section 153 detects a position Y=yQ which becomes the reference for a search in the horizontal direction on the upper side based on smaller one of yT which is the Y coordinate of the point T and yU which is the Y coordinate of the point U and y1 which is the Y coordinate of the point P1. The peripheral reference position detection section 153 detects a position Y=yR which becomes the reference for a search in the horizontal direction on the lower side based on smaller one of yV which is the Y coordinate of the point V and yW which is the Y coordinate of the point W and y2 which is the Y coordinate of the point P2.

The peripheral reference position detection section 153 determines the four points P5 to P8 by searching the differential image on the lines Y=yQ and Y=yR outward from the intersecting points of the four straight lines X=xt, X=xU, Y=yQ, and Y=yR for detecting pixels with an output. The peripheral reference position detection section 153 determines the remaining four points P9 to P12 using the same method as described above.

The endpoint detection section 154 can also determine the positions of the four corners of the projection region using this method by determining the center reference positions of the center block region 16 and the peripheral reference positions of the peripheral block regions 17-1 to 17-4.

In particular, according to this method, the projection region information generation section 155 can prevent undesired processing in which the peripheral reference positions are detected outside the projection target region in comparison with the method in the second embodiment, and calculate the approximation line in a state in which the three points for calculating the approximation line are positioned at larger intervals. Therefore, the projector 20 can more accurately detect the position of the projection region.

The number of center reference positions and the number of peripheral reference positions are arbitrary, and are not limited to those described in the above-described embodiments.

The patterns of the first calibration image 13 and the second calibration image 14 are not limited to the examples shown in FIG. 12A and 12B. It suffices that the center block region 16 be formed at least in a state of a differential image. In particular, it is preferable that the center block region 16 and the peripheral block regions 17-1 to 17-4 be formed in a state of a differential image. For example, the first calibration image 13 including the center block region 16 and the second calibration image 14 including the peripheral block regions 17-1 to 17-4 may be employed.

The shape of the calibration image, the center block region 16, and the peripheral block regions 17-1 to 17-4 is not limited to a quadrilateral. For example, a shape other than a quadrilateral such as circle may be employed. The shape of the entire calibration image and the shape of the center block region 16 may not be similar. It suffices that the calibration image and the center block region 16 have a shape which allows the correspondence between the shape of the calibration image and the shape of the center block region 16 to be identified. The number of peripheral block regions 17-1 to 17-4 is also arbitrary.

The present invention is also effective even in the case where an image is projected onto a projection target other than the screen 10, such as a blackboard or a whiteboard.

The above-described embodiments illustrate an example in which the image processing system is provided to the projector 20. However, the image processing system may be provided to an image display device other than the projector 20, such as a cathode ray tube (CRT). As the projector 20, a projector using a digital micromirror device (DMD) or the like may be used in addition to a liquid crystal projector. DMD is a trademark of Texas Instruments, Inc. (U.S.A.).

The functions of the projector 20 may be implemented by only the projector, or may be distributed over a plurality of processing devices (distribution processing by a projector and a PC, for example).

In the above-described embodiments, the sensor 60 is included in the projector 20. However, the sensor 60 may be configured as a device independent of the projector 20.

What is claimed is:

1. An image processing system comprising:
   image projection means for projecting first and second calibration images at different timings;
   sensing means, having an exposure adjustment function, for generating first sensing information and second sensing information by sensing each of the projected first and second calibration images;
   difference information generation means for generating difference information which shows a difference in a predetermined image signal value for each pixel in each of the first and second calibration images in a sensing region of the sensing means based on the first sensing information and the second sensing information; and
   endpoint detection means for searching the difference information as search target and for detecting an endpoint of a projection region in the sensing region,
   wherein the sensing means senses the first calibration image at an automatic exposure, and the sensing means senses the second calibration image at an exposure state determined when sensing the first calibration image.

2. An image processing system comprising:
   image projection means for projecting first and second calibration images at different timings;
   sensing means, having an exposure adjustment function, for generating first sensing information and second sensing information by sensing each of the projected first and second calibration images;
   difference information generation means for dividing a predetermined pixel region in a sensing region of the sensing means into pixel blocks each of which is formed of a plurality of pixels, for generating first pixel block preprocessing information and second pixel block preprocessing information which show an average value or sum of a predetermined image signal value of each of the pixels or the predetermined image signal value of a representative pixel in each of the pixel blocks based on the first sensing information and the second sensing information, for setting a pixel region which becomes a reference for an endpoint of a projection region in the sensing region based on a difference between the first pixel block preprocessing information and the second pixel block preprocessing information, and for generating difference information which shows a difference in the predetermined image signal value for each of the pixels near the pixel region based on the first sensing information and the second sensing information; and
   endpoint detection means for searching the difference information as search target and for detecting the endpoint of the projection region in the sensing region,
   wherein the sensing means senses the first calibration image at an automatic exposure, and the sensing means senses the second calibration image at an exposure state determined when sensing the first calibration image.

3. The image processing system as defined in claim 1,
   wherein the image projection means projects a single-color white calibration image as the first calibration image, and projects a single-color black calibration image as the second calibration image.

4. The image processing system as defined in claim 1,
wherein the difference information generation means generates a differential image between a first sensing image expressed by the first sensing information and a second sensing image expressed by the second sensing information as the difference information,
wherein the differential image includes a center block region located near a center of the differential image, a peripheral block region located around the center block region, and a background region other than the center block region and the peripheral block region, and
wherein each pixel in the center block region and the peripheral block region has a brightness index value differing from a brightness index value of each pixel in the background region.

5. The image processing system as defined in claim 4,
wherein the endpoint detection means includes:
center reference position detection means for detecting a plurality of center reference positions of the center block region in the sensing region of the sensing means based on the differential image;
peripheral reference position detection means for detecting a plurality of peripheral reference positions of the peripheral block region in the sensing region based on the center reference position; and
projection region information generation means for generating projection region information which shows the endpoint of the projection region based on the center reference positions and the peripheral reference positions.

6. The image processing system as defined in claim 5,
wherein the projection region information generation means generates the projection region information by determining shape or arrangement of the center block region and the peripheral block region by setting a plurality of approximation lines or approximation curves based on the center reference positions and the peripheral reference positions.

7. The image processing system as defined in claim 6,
wherein the projection region and the center block region are rectangular regions, and
wherein the projection region information generation means determines positions of four corners of the center block region by detecting intersecting points of the plurality of approximation lines or intersecting points of the plurality of approximation curves, and generates the projection region information which shows positions of four corners of the projection region based on the positions of the four corners of the center block region.

8. An image processing system comprising:
an image projection section which projects first and second calibration images at different timings;
a sensing section, having an exposure adjustment function, which generates first sensing information and second sensing information by sensing each of the projected first and second calibration images;
a difference information generation section which generates difference information which shows a difference in a predetermined image signal value for each pixel in each of the first and second calibration images in a sensing region of the sensing section based on the first sensing information and the second sensing information; and
an endpoint detection section which searches the difference information as search target and detects an endpoint of a projection region in the sensing region,
wherein the sensing section senses the first calibration image at an automatic exposure, and the sensing section senses the second calibration image at an exposure state determined when sensing the first calibration image.

9. An image processing system comprising:
an image projection section which projects first and second calibration images at different timings;
a sensing section, having an exposure adjustment function, which generates first sensing information and second sensing information by sensing each of the projected first and second calibration images;
a difference information generation section which divides a predetermined pixel region in a sensing region of the sensing section into pixel blocks each of which is formed of a plurality of pixels, generates first pixel block preprocessing information and second pixel block preprocessing information which show an average value or sum of a predetermined image signal value of each of the pixels or the predetermined image signal value of a representative pixel in each of the pixel blocks based on the first sensing information and the second sensing information, sets a pixel region which becomes a reference for an endpoint of a projection region in the sensing region based on a difference between the first pixel block preprocessing information and the second pixel block preprocessing information, and generates difference information which shows a difference in the predetermined image signal value for each of the pixels near the pixel region based on the first sensing information and the second sensing information; and
an endpoint detection section which searches the difference information as search target and detects the endpoint of the projection region in the sensing region,
wherein the sensing section senses the first calibration image at an automatic exposure, and the sensing section senses the second calibration image at an exposure state determined when sensing the first calibration image.

10. A projector comprising:
image projection means for projecting first and second calibration images at different timings;
sensing means, having an exposure adjustment function, for generating first sensing information and second sensing information by sensing each of the projected first and second calibration images;
difference information generation means for generating difference information which shows a difference in a predetermined image signal value for each pixel in each of the first and second calibration images in a sensing region of the sensing means based on the first sensing information and the second sensing information; and
endpoint detection means for searching the difference information as search target and for detecting an endpoint of a projection region in the sensing region,
wherein the sensing means senses the first calibration image at an automatic exposure, and the sensing means senses the second calibration image at an exposure state determined when sensing the first calibration image.

11. A projector comprising:
image projection means for projecting first and second calibration images at different timings;
sensing means, having an exposure adjustment function, for generating first sensing information and second sensing information by sensing each of the projected first and second calibration images;

difference information generation means for dividing a predetermined pixel region in a sensing region of the sensing means into pixel blocks each of which is formed of a plurality of pixels, for generating first pixel block preprocessing information and second pixel block preprocessing information which show an average value or sum of a predetermined image signal value of each of the pixels or the predetermined image signal value of a representative pixel in each of the pixel blocks based on the first sensing information and the second sensing information, for setting a pixel region which becomes a reference for an endpoint of a projection region in the sensing region based on a difference between the first pixel block preprocessing information and the second pixel block preprocessing information, and for generating difference information which shows a difference in the predetermined image signal value for each of the pixels near the pixel region based on the first sensing information and the second sensing information; and endpoint detection means for searching the difference information as search target and for detecting the endpoint of the projection region in the sensing region, wherein the sensing means senses the first calibration image at an automatic exposure, and the sensing means senses the second calibration image at an exposure state determined when sensing the first calibration image.

12. A projector comprising:

an image projection section which projects first and second calibration images at different timings;

a sensing section, having an exposure adjustment function, which generates first sensing information and second sensing information by sensing each of the projected first and second calibration images;

a difference information generation section which generates difference information which shows a difference in a predetermined image signal value for each pixel in each of the first and second calibration images in a sensing region of the sensing section based on the first sensing information and the second sensing information; and an endpoint detection section which searches the difference information as search target and detects an endpoint of a projection region in the sensing region, wherein the sensing section senses the first calibration image at an automatic exposure, and the sensing section senses the second calibration image at an exposure state determined when sensing the first calibration image.

13. A projector comprising:

an image projection section which projects first and second calibration images at different timings;

a sensing section, having an exposure adjustment function, which generates first sensing information and second sensing information by sensing each of the projected first and second calibration images;

a difference information generation section which divides a predetermined pixel region in a sensing region of the sensing section into pixel blocks each of which is formed of a plurality of pixels, generates first pixel block preprocessing information and second pixel block preprocessing information which show an average value or sum of a predetermined image signal value of each of the pixels or the predetermined image signal value of a representative pixel in each of the pixel blocks based on the first sensing information and the second sensing information, sets a pixel region which becomes a reference for an endpoint of a projection region in the sensing region based on a difference between the first pixel block preprocessing information and the second pixel block preprocessing information, and generates difference information which shows a difference in the predetermined image signal value for each of the pixels near the pixel region based on the first sensing information and the second sensing information; and an endpoint detection section which searches the difference information as search target and detects the endpoint of the projection region in the sensing region, wherein the sensing section senses the first calibration image at an automatic exposure, and the sensing section senses the second calibration image at an exposure state determined when sensing the first calibration image.

14. An information storage medium storing a computer-readable program which causes a computer to function as:

image projection means for projecting first and second calibration images at different timings;

sensing means, having an exposure adjustment function, for generating first sensing information and second sensing information by sensing each of the projected first and second calibration images;

difference information generation means for generating difference information which shows a difference in a predetermined image signal value for each pixel in each of the first and second calibration images in a sensing region of the sensing means based on the first sensing information and the second sensing information; and endpoint detection means for searching the difference information as search target and for detecting an endpoint of a projection region in the sensing region, wherein the sensing means senses the first calibration image at an automatic exposure, and the sensing means senses the second calibration image at an exposure state determined when sensing the first calibration image.

15. An information storage medium storing a computer-readable program which causes a computer to function as:

image projection means for projecting first and second calibration images at different timings;

sensing means, having an exposure adjustment function, for generating first sensing information and second sensing information by sensing each of the projected first and second calibration images;

difference information generation means for dividing a predetermined pixel region in a sensing region of the sensing means into pixel blocks each of which is formed of a plurality of pixels, for generating first pixel block preprocessing information and second pixel block preprocessing information which show an average value or sum of a predetermined image signal value of each of the pixels or the predetermined image signal value of a representative pixel in each of the pixel blocks based on the first sensing information and the second sensing information, for setting a pixel region which becomes a reference for an endpoint of a projection region in the sensing region based on a difference between the first pixel block preprocessing information and the second pixel block preprocessing information, and for generating difference information which shows a difference in the predetermined image signal value for each of the pixels near the pixel region based on the first sensing information and the second sensing information; and endpoint detection means for searching the difference information as search target and for detecting the endpoint of the projection region in the sensing region, wherein the sensing means senses the first calibration image at an automatic exposure, and the sensing means senses the second calibration image at an exposure state determined when sensing the first calibration image.

16. An image processing method comprising:

projecting a first calibration image;

generating first sensing information by sensing the projected first calibration image at an automatic exposure setting;

projecting a second calibration image;

generating second sensing information by sensing the projected second calibration image at an exposure determined when sensing the first calibration image;

generating difference information which shows a difference in a predetermined image signal value for each pixel in a sensing region based on the first sensing information and the second sensing information; and searching the difference information as a search target and detecting an endpoint of a projection region in the sensing region.

17. An image processing method comprising:

projecting a first calibration image;

generating first sensing information by sensing the projected first calibration image at an automatic exposure setting;

projecting a second calibration image;

generating second sensing information by sensing the projected second calibration image at an exposure determined when sensing the first calibration image;

dividing a predetermined pixel region in a sensing region into pixel blocks each of which is formed of a plurality of pixels based on the first sensing information and the second sensing information;

generating first pixel block preprocessing information and second pixel block preprocessing information which show an average value or sum of a predetermined image signal value of each of the pixels or the predetermined image signal value of the representative pixel in each of the pixel blocks;

setting a pixel region which becomes a reference for an endpoint of a projection region in the sensing region based on a difference between the first pixel block preprocessing information and the second pixel block preprocessing information;

generating difference information which shows a difference in the predetermined image signal value for each of the pixels near the pixel region based on the first sensing information and the second sensing information; and searching the difference information as a search target and detecting the endpoint of the projection region in the sensing region.

18. The image processing method as defined in claim 16, wherein the first calibration image is a single-color white calibration image, and the second calibration image is a single-color black calibration image.

19. The image processing method as defined in claim 16, wherein a differential image between a first sensing image expressed by the first sensing information and a second sensing image expressed by the second sensing information is generated as the difference information, wherein the differential image includes a center block region located near a center of the differential image, a peripheral block region located around the center block region, and a background region other than the center block region and the peripheral block region, and wherein each pixel in the center block region and the peripheral block region has a brightness index value differing from a brightness index value of each pixel in the background region.

20. The image processing method as defined in claim 19, comprising:

detecting a plurality of center reference positions of the center block region in the sensing region based on the differential image;

detecting a plurality of peripheral reference positions of the peripheral block region in the sensing region based on the center reference position; and generating projection region information which shows the endpoint of the projection region based on the center reference positions and the peripheral reference positions.

21. The image processing method as defined in claim 20, comprising:

generating the projection region information by determining shape or arrangement of the center block region and the peripheral block region by setting a plurality of approximation lines or approximation curves based on the center reference positions and the peripheral reference positions.

22. The image processing method as defined in claim 21, wherein the projection region and the center block region are rectangular regions, and wherein the method includes determining positions of four corners of the center block region by detecting intersecting points of the plurality of approximation lines or intersecting points of the plurality of approximation curves, and generating the projection region information which shows positions of four corners of the projection region based on the positions of the four corners of the center block region.

* * * * *